United States Patent
Nanba

[11] Patent Number: 6,163,400
[45] Date of Patent: Dec. 19, 2000

[54] VARIABLE MAGNIFICATION OPTICAL SYSTEM AND IMAGE PICKUP APPARATUS USING THE SAME

[75] Inventor: Norihiro Nanba, Kawasaki, Japan

[73] Assignee: Canon Kabushiki Kaisha, Tokyo, Japan

[21] Appl. No.: 08/893,238

[22] Filed: Jul. 15, 1997

[30] Foreign Application Priority Data

Jul. 19, 1996 [JP] Japan ................................. 8-208904

[51] Int. Cl.[7] .......................... G02B 27/00; G02B 23/06
[52] U.S. Cl. ....................... 359/365; 359/432; 359/433; 359/435; 359/731
[58] Field of Search ........................ 359/362, 364–367, 359/725–732, 422–432, 618, 676, 630–635, 856–863; 396/373–386

[56] References Cited

U.S. PATENT DOCUMENTS

| | | | |
|---|---|---|---|
| 3,674,334 | 7/1972 | Offner | 359/366 |
| 4,192,573 | 3/1980 | Brown, Jr. | 359/365 |
| 4,265,510 | 5/1981 | Cook | 359/366 |
| 4,477,156 | 10/1984 | Gebelein et al. | 359/364 |
| 4,571,036 | 2/1986 | Gebelein et al. | 359/364 |
| 4,737,021 | 4/1988 | Korsch | 359/366 |
| 4,775,217 | 10/1988 | Ellis | 359/404 |
| 4,812,028 | 3/1989 | Matsumoto | 359/727 |
| 4,812,030 | 3/1989 | Pinson | 359/859 |
| 4,993,818 | 2/1991 | Cook | 359/366 |
| 5,063,586 | 11/1991 | Jewell et al. | 378/34 |
| 5,144,476 | 9/1992 | Kebo | 359/366 |
| 5,638,219 | 6/1997 | Medina Puerta et al. | 359/729 |

FOREIGN PATENT DOCUMENTS

| | | |
|---|---|---|
| 29 27 515 | 1/1981 | Germany. |
| 195 23 148 | 1/1996 | Germany. |
| 2-297516 | 12/1990 | Japan. |
| 5-12704 | 1/1993 | Japan. |
| 6-139612 | 5/1994 | Japan. |
| 2 126 746 | 3/1984 | United Kingdom .................. 359/434 |

OTHER PUBLICATIONS

W.E. Woehl, "An All–Reflective Zoom Optical System for the Infrared," Optical Engineering, vol. 20, No. 3, Jun. 1981, pp. 450–459.

K. Tanaka, "A Novel Configuration of Zoom Lens," OPTIK, vol. 73, No. 4, Jul. 1986, pp. 157–159.

H. P. Brueggemann, "Linear Reverting Lens With Uniform Illumination," Xerox Disclosure Journal, vol. 11, No. 3, Jun. 1986, pp. 111–113.

Primary Examiner—Thong Nguyen
Attorney, Agent, or Firm—Fitzpatrick, Cella, Harper & Scinto

[57] ABSTRACT

A variable magnification optical system comprising four optical units each having a reflecting surface inclined with respect to a reference axis ray which is a ray passing from an aperture center of an aperture stop to a center of a final image plane, the variable magnification optical system being arranged to perform a magnification varying operation by moving at least two of the four optical units along the reference axis ray in such a manner as to vary an optical path length which extends along the reference axis ray from a predetermined position on an object side to the final image plane.

24 Claims, 21 Drawing Sheets

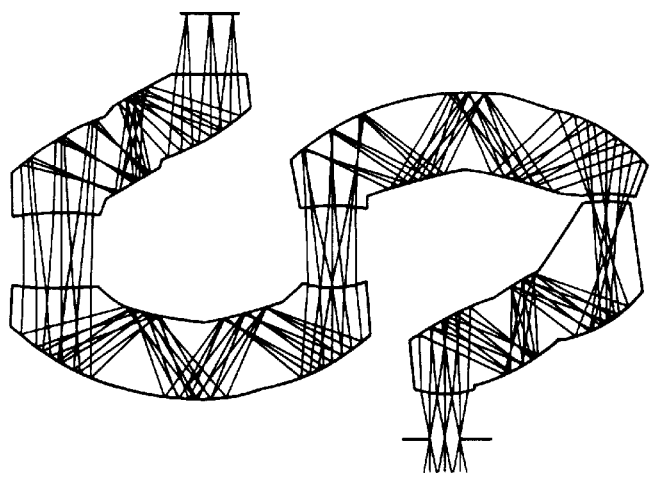
FIG. 10     FIG. 11
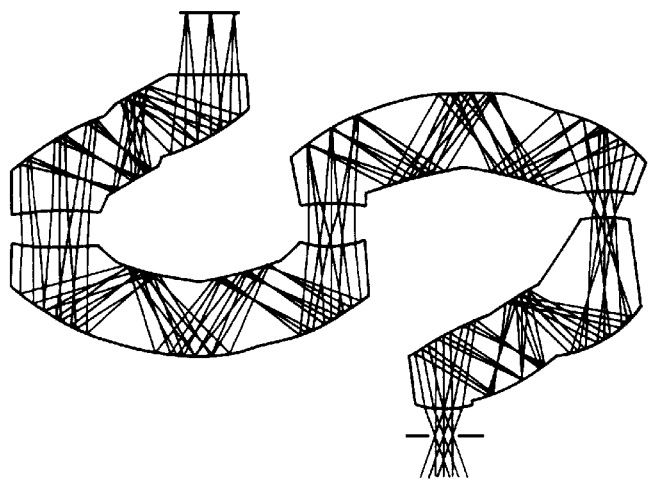
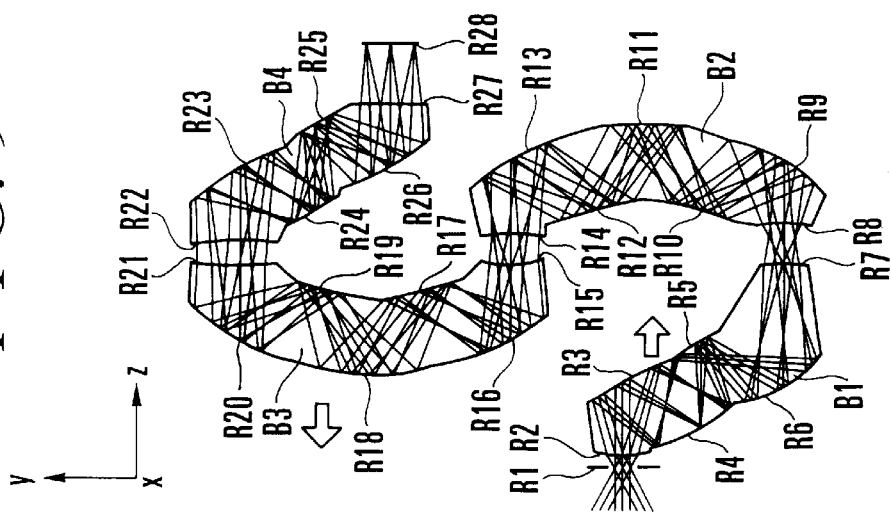
FIG. 9

(VERTICAL ANGLE OF VIEW, HORIZONTAL ANGLE OF VIEW)

F I G. 15
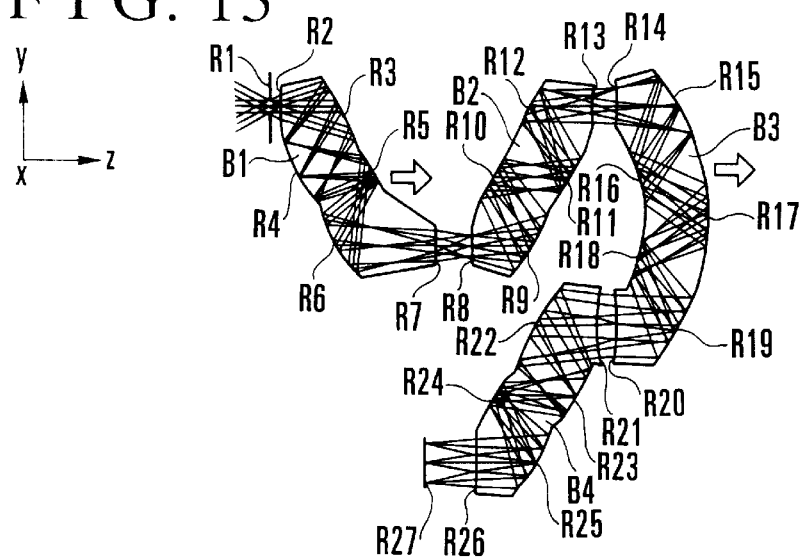
F I G. 16
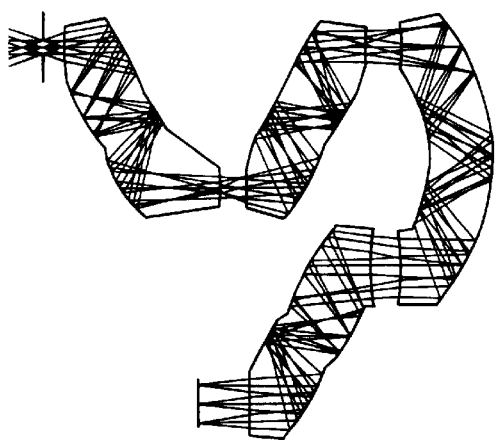
F I G. 17
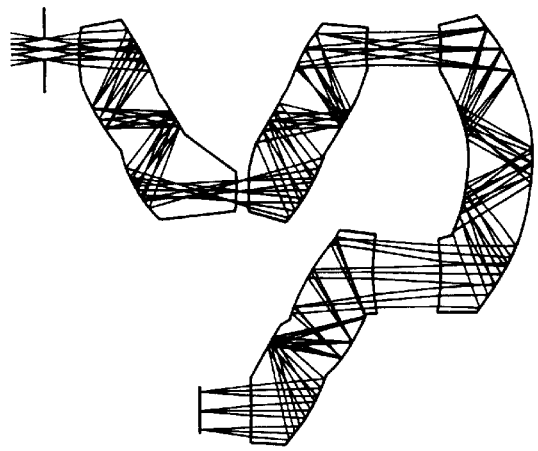

(VERTICAL ANGLE OF VIEW, HORIZONTAL ANGLE OF VIEW)

F I G. 21
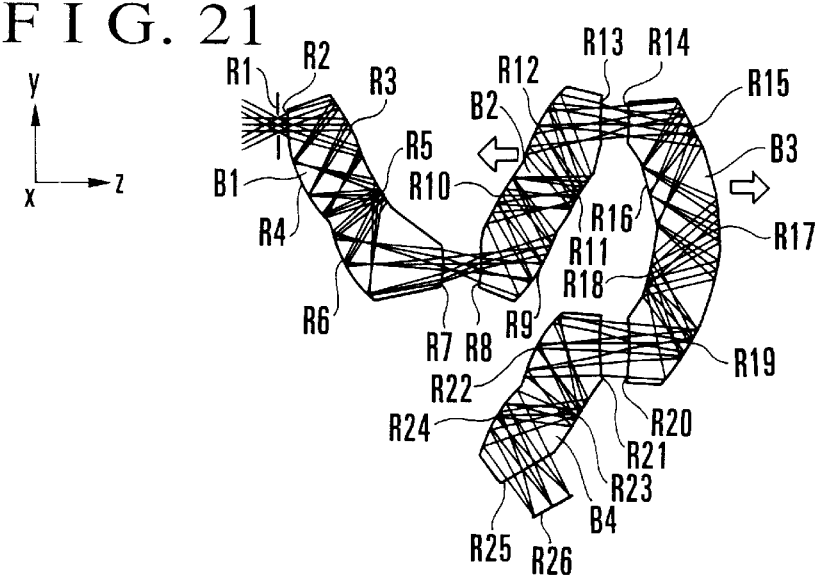
F I G. 22
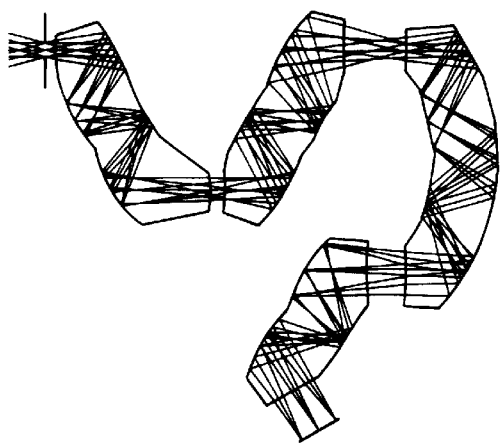
F I G. 23
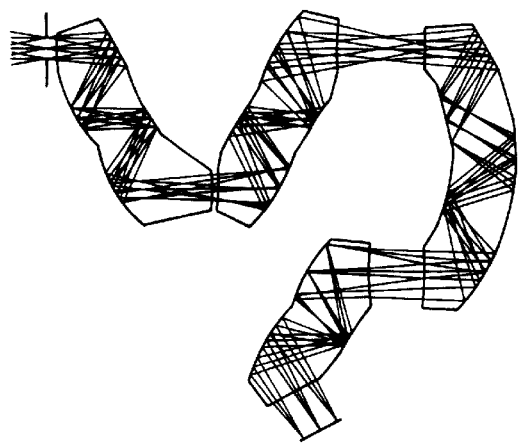

(VERTICAL ANGLE OF VIEW, HORIZONTAL ANGLE OF VIEW)

(VERTICAL ANGLE OF VIEW, HORIZONTAL ANGLE OF VIEW)

(VERTICAL ANGLE OF VIEW, HORIZONTAL ANGLE OF VIEW)

VARIABLE MAGNIFICATION OPTICAL SYSTEM AND IMAGE PICKUP APPARATUS USING THE SAME

BACKGROUND OF THE INVENTION

1. Field of the Invention

The present invention relates to a variable magnification optical system and an image pickup apparatus using the same and, more specifically, to an optical arrangement suitable for use in a video camera, a still video camera, a copying machine and the like which are arranged to realize variation of magnification by using an optical unit having decentered reflecting surfaces, as a magnification varying optical unit.

2. Description of Related Art

It is known that an optical system of the type which is composed of only refracting lenses has been provided as a variable magnification optical system. In such a conventional optical system, refracting lenses each having a spheric surface or aspheric surface of rotational symmetry are rotationally symmetrically arranged with respect to the optical axis.

In addition, various photographing optical systems using reflecting surfaces such as concave mirrors or convex mirrors have heretofore been proposed, and an optical system using both a reflecting system and a refracting system is also well known as a catadioptric system.

FIG. 27 is a schematic view of a so-called mirror optical system which is composed of one concave mirror and one convex mirror. In the mirror optical system shown in FIG. 27, an object light beam 104 from an object is reflected by a concave mirror 101 and travels toward an object side while being converged, and after having been reflected by a convex mirror 102, the object light beam 104 is refracted by a lens 110 and forms an image of the object on an image plane 103.

This mirror optical system is based on the construction of a so-called Cassegrainian reflecting telescope, and is intended to reduce the entire length of the optical system by bending, by using the two opposed reflecting mirrors, the optical path of a telephoto lens system which is composed of refracting lenses and has an entire large length.

For similar reasons, in the field of an objective lens system which constitutes part of a telescope as well, in addition to the Cassegrainian type, various other types which are arranged to reduce the entire length of an optical system by using a plurality of reflecting mirrors have been known.

As is apparent from the above description, it has heretofore been proposed to provide a compact mirror optical system by efficiently bending an optical path by using reflecting mirrors in place of lenses which are commonly used in a photographing lens whose entire length is large.

However, in general, the mirror optical system, such as the Cassegrainian reflecting telescope, has the problem that part of an object ray is blocked by the convex mirror 102. This problem is due to the fact that the convex mirror 102 is placed in the area through which the object light beam 104 passes.

To solve the problem, it has been proposed to provide a mirror optical system which employs decentered reflecting mirrors to prevent a portion of the optical system from blocking the area through which the object light beam 104 passes, i.e., to separate a principal ray of the object light beam 104 from an optical axis 105.

FIG. 28 is a schematic view of the mirror optical system disclosed in U.S. Pat. No. 3,674,334. This mirror optical system solves the above-described blocking problem by using part of reflecting mirrors which are rotationally symmetrical about the optical axis.

In the mirror optical system shown in FIG. 28, a concave mirror 111, a convex mirror 113 and a concave mirror 112 are arranged in the order of passage of the light beam, and these mirrors 111, 113 and 112 are reflecting mirrors which are rotationally symmetrical about an optical axis 114, as shown by two-dot chain lines in FIG. 28. In the shown mirror optical system, a principal ray 116 of an object light beam 115 is separated from the optical axis 114 to prevent shading of the object light beam 115, by using only the upper portion of the concave mirror 111 which is above the optical axis 114 as viewed in FIG. 28, only the lower portion of the convex mirror 113 which is below the optical axis 114 as viewed in FIG. 28, and only the lower portion of the concave mirror 112 which is below the optical axis 114 as viewed in FIG. 28.

FIG. 29 is a schematic view of the mirror optical /closed in U.S. Pat. No. 5,063,586. The shown /cal system solves the above-described problem by /ering the central axis of each reflecting mirror from an doptical axis and separating the principal ray of an object light beam from the optical axis. As shown in FIG. 29 in which an axis perpendicular to an object plane 121 is defined as an optical axis 127, a convex mirror 122, a concave mirror 123, a convex mirror 124 and a concave mirror 125 are arranged in the order of passage of the light beam, and the central coordinates and central axes 122a, 123a, 124a and 125a (axes which respectively connect the centers of reflecting surfaces and the centers of curvature thereof) of the reflecting surfaces of the respective mirrors 122 to 125 are decentered from the optical axis 127. In the shown mirror optical system, by appropriately setting the amount of decentering and the radius of curvature of each of the surfaces, each of the reflecting mirrors is prevented from shading an object light beam 128, so that an object image is efficiently formed on an image plane 126.

In addition, U.S. Pat. Nos. 4,737,021 and 4,265,510 also disclose an arrangement for preventing the shading problem by using part of a reflecting mirror which is rotationally symmetrical about an optical axis, or an arrangement for preventing the shading problem by decentering the central axis of the reflecting mirror from the optical axis.

One example of a catadioptric optical system which uses both a reflecting mirror and a refracting lens and has a magnification varying function is a deep-sky telescope such as that disclosed in each of U.S. Pat. Nos. 4,477,156 and 4,571,036. The deep-sky telescope uses a parabolic reflecting mirror as a primary mirror and has a magnification varying function using an Erfle eyepiece.

Another variable magnification optical system is known which varies the image forming magnification (focal length) of a photographing optical system by relatively moving a plurality of reflecting mirrors which constitute part of the aforesaid type of mirror optical system.

For example, U.S. Pat. No. 4,812,030 discloses an art for performing variation of the magnification of the photographing optical system by relatively varying the distance between the concave mirror 101 and the convex mirror 102 and the distance between the convex mirror 102 and the image plane 103 in the construction of the Cassegrainian reflecting telescope shown in FIG. 27.

FIG. 30 is a schematic view of another embodiment disclosed in U.S. Pat. No. 4,812,030. In the shown embodiment, an object light beam 138 from an object is made incident on and reflected by a first concave mirror 131, and travels toward an object side as a converging light beam and is made incident on a first convex mirror 132. The light beam is reflected toward an image forming plane by the first convex mirror 132 and is made incident on a second convex mirror 134 as an approximately parallel light beam. The light beam is reflected by the second convex mirror 134 and is made incident on a second concave mirror 135 as a diverging light beam. The light beam is reflected by the second concave mirror 135 as a converging light beam and forms an image of the object on an image plane 137. In this arrangement, by varying a distance 133 between the first concave mirror 131 and the first convex mirror 132 and a distance 136 between the second convex mirror 134 and the second concave mirror 135, zooming is performed and the focal length of the entire mirror optical system is varied.

In the arrangement disclosed in U.S. Pat. No. 4,993,818, an image formed by the Cassegrainian reflecting telescope shown in FIG. 27 is secondarily formed by another mirror optical system provided in a rear stage, and the magnification of the entire photographing optical system is varied by varying the image forming magnification of that second-order image forming mirror optical system.

In any of the above-described reflecting types of photographing optical systems, a large number of constituent components are needed and individual optical components need to be assembled with high accuracy to obtain the required optical performance. Particularly since the relative position accuracy of each of the reflecting mirrors is strict, it is indispensable to adjust the position and the angle of each of the reflecting mirrors.

One proposed approach to solving this problem is to eliminate the incorporation error of optical components which occurs during assembly, as by forming a mirror system as one block.

A conventional example in which a multiplicity of reflecting surfaces are formed as one block is an optical prism, such as a pentagonal roof prism or a Porro prism, which is used in, for example, a viewfinder optical system. In the case of such a prism, since a plurality of reflecting surfaces are integrally formed, the relative positional relationships between the respective reflecting surfaces are set with high accuracy, so that adjustment of the relative positions between the respective reflecting surfaces is not needed. Incidentally, the primary function of the prism is to reverse an image by varying the direction in which a ray travels, and each of the reflecting surfaces consists of a plane surface.

Another type of optical system, such as a prism having reflecting surfaces with curvatures, is also known.

FIG. 31 is a schematic view of the essential portion of the observing optical system which is disclosed in U.S. Pat. No. 4,775,217. This observing optical system is an optical system which not only allows an observer to observe a scene of the outside but also allows the observer to observe a display image displayed on an information display part, in the form of an image which overlaps the scene.

In this observing optical system, a display light beam 145 which exits from the display image displayed on an information display part 141 is reflected by a surface 142 and travels toward an object side and is made incident on a half-mirror surface 143 consisting of a concave surface. After having been reflected by the half-mirror surface 143, the display light beam 145 is formed into an approximately parallel light beam by the refractive power of the half-mirror surface 143. This approximately parallel light beam is refracted by and passes through a surface 142, and forms a magnified virtual image of the display image and enters a pupil 144 of an observer so that the observer recognizes the display image.

In the meantime, an object light beam 146 from an object is made incident on a surface 147 which is approximately parallel to the reflecting surface 142, and is then refracted by the surface 147 and reaches the half-mirror surface 143 which is a concave surface. Since the concave surface 143 is coated with an evaporated semi-transparent film, part of the object light beam 146 passes through the concave surface 143, is refracted by and passes through the surface 142, and enters the pupil 144 of the observer. Thus, the observer can visually recognize the display image as an image which overlaps the scene of the outside.

FIG. 32 is a schematic view of the essential portion of the observing optical system disclosed in Japanese Laid-Open Pat. Application No. Hei 2-297516. This observing optical system is also an optical system which not only allows an observer to observe a scene of the outside but also allows the observer to observe a display image displayed on an information display part, as an image which overlaps the scene.

In this observing optical system, a display light beam 154 which exits from an information display part 150 passes through a plane surface 157 which constitutes part of a prism Pa, and is made incident on a parabolic reflecting surface 151. The display light beam 154 is reflected by the reflecting surface 151 as a converging light beam, and forms an image on a focal plane 156. At this time, the display light beam 154 reflected by the reflecting surface 151 reaches the focal plane 156 while being totally reflected between two parallel plane surfaces 157 and 158 which constitute part of the prism Pa. Thus, the thinning of the entire optical system is achieved.

Then, the display light beam 154 which exits from the focal plane 156 as a diverging light beam is totally reflected between the plane surface 157 and the plane surface 158, and is made incident on a half-mirror surface 152 which consists of a parabolic surface. The display light beam 154 is reflected by the half-mirror surface 152 and, at the same time, not only is a magnified virtual image of a display image formed but also the display light beam 154 is formed into an approximately parallel light beam by the refractive power of the half-mirror surface 152. The obtained light beam passes through the surface 157 and enters a pupil 153 of the observer, so that the observer can recognize the display image.

In the meantime, an object light beam 155 from the outside passes through a surface 158b which constitutes part of a prism Pb, then through the half-mirror surface 152 which consists of a parabolic surface, then through the surface 157, and is then made incident on the pupil 153 of the observer. Thus, the observer visually recognizes the display image as an image which overlaps the scene of the outside.

As another example which uses an optical unit on a reflecting surface of a prism, optical heads for optical pickups are disclosed in, for example, Japanese Laid-Open Pat. Application Nos. Hei 5-12704 and Hei 6-139612. In these optical heads, after the light outputted from a semiconductor laser has been reflected by a Fresnel surface or a hologram surface, the reflected light is focused on a surface of a disk and the light reflected from the disk is conducted to a detector.

However, in any of the aforesaid optical systems composed of conventional refracting optical units only, a stop is disposed in the inside of the optical system, and an entrance pupil is in many cases formed at a position deep in the optical system. This leads to the problem that the larger the distance to a pupil plane lying at a position which is the closest to the object side as viewed from the stop, the effective ray diameter of the entrance pupil becomes the larger with the enlargement of the angle of view.

In any of the above-described mirror optical systems having the decentered mirrors, which are disclosed in U.S. Pat. Nos. 3,674,334, 5,063,586 and 4,265,510, since the individual reflecting mirrors are disposed with different amounts of decentering, the mounting structure of each of the reflecting mirrors is very complicated and the mounting accuracy of the reflecting mirrors is very difficult to ensure.

In either of the above-described photographing optical systems having the magnification varying functions, which are disclosed in U.S. Pat. Nos. 4,812,030 and 4,993,818, a large number of constituent components, such as a reflecting mirror or an image forming lens, are needed, and it is necessary to assemble each optical part with high accuracy to realize the required optical performance.

In particular, since the relative position accuracy of the reflecting mirrors is strict, it is necessary to adjust the position and the angle of each of the reflecting mirrors.

As is known, conventional reflecting types of photographing optical systems have constructions which are suited to a so-called telephoto lens using an optical system having an entire large length and a small angle of view.

However, if a photographing optical system which needs fields of view from a standard angle of view to a wide angle of view is to be obtained, the number of reflecting surfaces which are required for aberration correction must be increased, so that a far higher component accuracy and assembly accuracy are needed and the cost and the entire size of the optical system tend to increase.

The above-described observing optical system disclosed in U.S. Pat. No. 4,775,217 (refer to FIG. 31) is realized as a small-sized observing optical system which is composed of a plane refracting surface and a concave half-mirror surface. However, the exit surface 142 for the light beam 145 from the information display part 141 and the light beam 146 from the outside needs to be used as a total reflecting surface for the light beam 145 exiting from the information display part 141, so that it is difficult to give a curvature to the surface 142 and no aberration correction is effected at the exit surface 142.

The above-described observing optical system disclosed in Japanese Laid-Open Pat. Application No. Hei 2-297516 (refer to FIG. 32) is realized as a small-sized observing optical system which is composed of a plane refracting surface, a parabolic reflecting surface and a half-mirror consisting of a parabolic surface. In this observing optical system, the entrance surface 158 and the exit surface 157 for the object light beam 155 from the outside are formed to extend so that their respective extending surfaces can be used as total reflecting surfaces for guiding the light beam 154 which exits from the information display part 150. For this reason, it is difficult to give curvatures to the respective surfaces 158 and 157 and no aberration correction is effected at either of the entrance surface 158 and the exit surface 157.

The range of applications of either of the optical systems for optical pickups which are disclosed in, for example, Japanese Laid-Open Patent Application Nos. Hei 5-12704 and Hei 6-139612 is limited to the field of a detecting optical system, and neither of them satisfies the image forming performance required for, particularly, an image pickup apparatus which uses an area type of image pickup device, such as a CCD.

BRIEF SUMMARY OF THE INVENTION

An object of the present invention is to provide a high-performance variable magnification optical system which includes four off-axial optical units two of which relatively move to vary the magnification of the variable magnification optical system, the variable magnification optical system being capable of varying the magnification while varying the optical path length from an object to a final image plane with the final image forming plane spatially fixed, so that the thickness of the variable magnification optical system is small in spite of its wide angle of view and its entire length is short in a predetermined direction as well as its decentering aberration is fully corrected over the entire range of variation of magnification.

Another object of the present invention is to provide an image pickup apparatus using the aforesaid high-performance variable magnification optical system.

Another object of the present invention is to provide a variable magnification optical system having at least one of the following effects and advantages, and an image pickup apparatus employing such a variable magnification optical system.

Since a stop is arranged on the object side of the variable magnification optical system or in the vicinity of the first surface and an object image is formed by a plurality of times in the variable magnification optical system, the effective diameter and the thickness of the variable magnification optical system can be made small in spite of its wide angle of view.

Since each optical unit has a plurality of reflecting surfaces having appropriate refractive powers and the reflecting surfaces are arranged in a decentered manner, the optical path in the variable magnification optical system can be bent into a desired shape to reduce the entire length of the variable magnification optical system in a predetermined direction.

A plurality of optical units which constitute the variable magnification optical system are each formed as a transparent body on which two refracting surfaces and a plurality of reflecting surfaces are integrally formed in such a manner that each of the reflecting surfaces is arranged in a decentered manner and is given an appropriate refractive power. Accordingly, the decentering aberration of the variable magnification optical system can be fully corrected over the entire range of variation of magnification.

Since each magnification varying optical unit is formed as a transparent body on which two refracting surfaces and a plurality of curved or plane reflecting surfaces are integrally formed, not only is it possible to reduce the entire size of the variable magnification optical system, but it is also possible to solve the problem of excessively strict arrangement accuracy (assembly accuracy) which would have often been experienced with reflecting surfaces.

Since the fourth optical unit is a fixed off-axial optical unit, aberration correction becomes far easier, and it is possible, in terms of design, to flexibly cope with various layouts of an image pickup medium and an imagepickup-light-beam introducing aperture to be disposed for the image pickup apparatus.

To achieve the above objects, in accordance with one aspect of the present invention, there is provided a variable magnification optical system which comprises a stop and four off-axial optical units inclined with respect to a reference axis ray, and in which if a ray which exits from an object and enters the variable magnification optical system, and passes through a center of the stop of the variable magnification optical system and reaches a center of a final image plane is represented as a reference axis ray; a reference axis ray which is incident on any surface of the variable magnification optical system or enters any of the optical units is represented as an entering reference axis of the aforesaid any surface or the aforesaid any optical unit; a reference axis ray which exits from the aforesaid any surface or the aforesaid any optical unit is represented as an exiting reference axis of the aforesaid any surface or the aforesaid any optical unit; an intersection of the entering reference axis and the aforesaid any surface is represented as a reference point; a direction in which the reference axis ray travels from an object side toward an image plane along the entering reference axis is represented as a direction of the entering reference axis; and a direction in which the reference axis ray travels from the object side toward the image plane along the exiting reference axis is represented as a direction of the exiting reference axis, the variable magnification optical system is arranged to perform a magnification varying operation by moving at least two of the off-axial optical units, and the entire optical path length from a predetermined position on the object side to the final image plane along the reference axis ray varies during the magnification varying operation.

In accordance with another aspect of the present invention, in the variable magnification optical system, letting the respective four off-axial optical units be first, second, third and fourth optical units in that order from the object side along the reference axis ray, the direction of the entering reference axis and the direction of the exiting reference axis of the first off-axial optical unit are the same as each other, and the direction of the entering reference axis and the direction of the exiting reference axis of each of the second and third off-axial optical units differ from each other by 180°. The first and third off-axial optical units are arranged to move to perform the magnification varying operation.

In accordance with another aspect of the present invention, in the variable magnification optical system, the direction of the entering reference axis and the direction of the exiting reference axis of each of the first and second off-axial optical units are the same as each other, and the direction of the entering reference axis and the direction of the exiting reference axis of the third off-axial optical unit differ from each other by 180°. The first and third off-axial optical units are arranged to move to perform the magnification varying operation.

In accordance with another aspect of the present invention, in the variable magnification optical system, the direction of the entering reference axis and the direction of the exiting reference axis of each of the first and second off-axial optical units are the same as each other, and the direction of the entering reference axis and the direction of the exiting reference axis of the third off-axial optical unit differ from each other by 180°. The second and third off-axial optical units are arranged to move to perform the magnification varying operation.

The off-axial optical unit is an optical unit formed as a transparent body on which two refracting surfaces and one or more off-axial reflecting surfaces are integrally formed.

The stop is located on the object side of an off-axial optical unit which is closest to the object side.

An off-axial optical unit which is the closest to the final image plane of all the four off-axial optical units is fixed during the magnification varying operation, and the direction of the entering reference axis and the direction of the exiting reference axis of such off-axial optical unit are inclined with respect to each other.

In accordance with another aspect of the present invention, there is provided an image pickup apparatus which comprises the aforesaid variable magnification optical system, the image pickup apparatus being arranged to form an image of the object on an image pickup surface of an image pickup medium.

The above and other objects, features and advantages of the present invention will become apparent from the following detailed description of preferred embodiments as well as numerical examples, taken in conjunction with the accompanying drawings.

BRIEF DESCRIPTION OF THE SEVERAL VIEWS OF THE DRAWING

FIG. 9 is an optical cross-sectional view of Numerical Example 1 relative to its wide-angle end;

FIG. 10 is an optical cross-sectional view of Numerical Example 1 relative to its middle position;

FIG. 11 is an optical cross-sectional view of Numerical Example 1 relative to its telephoto end;

FIG. 15 is an optical cross-sectional view of Numerical Example 2 relative to its wide-angle end;

FIG. 16 is an optical cross-sectional view of Numerical Example 2 relative to its middle position;

FIG. 17 is an optical cross-sectional view of Numerical Example 2 relative to its telephoto end;

FIG. 21 is an optical cross-sectional view of Numerical Example 3 relative to its wide-angle end;

FIG. 22 is an optical cross-sectional view of Numerical Example 3 relative to its middle position;

FIG. 23 is an optical cross-sectional view of Numerical Example 3 relative to its telephoto end;

DETAILED DESCRIPTION OF THE INVENTION

Figure 1:
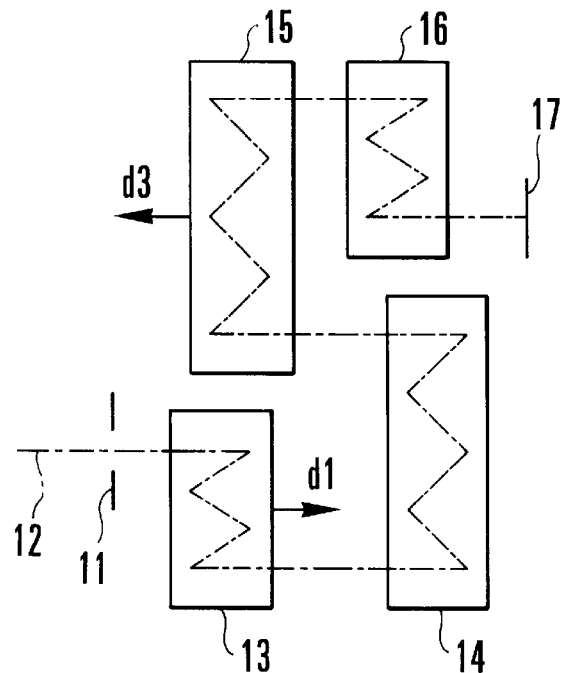
FIG. 1 is a view of the basic arrangement of a first embodiment of a variable magnification optical system according to the present invention.

Preferred embodiments of the present invention will be described below in detail with reference to the accompanying drawings.

The variable magnification optical system according to the present invention does not have a symmetrical axis like the optical axis of an ordinary optical system. For this reason, a "reference axis" is set in the variable magnification optical system and the arrangements and constructions of various elements of the optical system will be described below on the basis of the reference axis.

First of all, the definition of the reference axis will be described. In general, the "reference axis" in an optical system is defined as an optical path along which a particular reference ray having a reference wavelength travels from an object plane to an image plane. Since the reference ray is not yet determined from only this definition, a reference axis ray is determined normally in accordance with either of the following two principles.

(1) If an axis having symmetry which is even partial is present in an optical system and correction of aberration can be effected with sufficient symmetry, a ray which passes along the axis having symmetry is determined as the reference axis ray.

(2) If a symmetrical axis is generally absent in an optical system or if a symmetrical axis is partly present but correction of aberration can not be effected with sufficient symmetry, a ray which comes from the center of an object plane (the center of the area of a scene being observed or photographed) and passes through the center of the stop provided in the optical system after having sequentially passed through specified surfaces in the optical system, or a ray which passes through the center of the stop provided in the optical system and reaches the center of a final image plane is determined as the reference axis ray, and the optical path of the reference axis ray is determined as the reference axis.

The reference axis defined in the above-described manner generally has a bent shape. It is assumed here that each surface has a reference point which is the intersection of the surface and a reference axis ray, and that the reference axis rays located on the object and image sides of each surface are called an entering reference axis and an exiting reference axis, respectively. In addition, the reference axis has a direction, and the direction is a direction in which the reference axis ray travels to form an image. Therefore, the direction of the entering reference axis and the direction of the exiting reference axis are present on the entrance and exit sides of each surface, respectively. The reference axis is refracted by individual surfaces in a predetermined order thereof, or changes its direction in accordance with the law of reflection, and finally reaches an image plane. Incidentally, if an optical unit (optical system) includes a plurality of surfaces, a reference axis ray which is made incident on a surface closest to the object side is defined as the entering reference axis of the optical unit (optical system), and a reference axis ray which exits from a surface closest to the image side is defined as the exiting reference axis of the optical unit (optical system). The definitions of the directions of the respective entering and exiting reference axes are the same as those of the directions of the entering and exiting reference axes of each surface.

FIG. 1 is a view of the basic arrangement of a first embodiment of the variable magnification optical system according to the present invention. In FIG. 1, reference numeral 11 denotes a stop, reference numeral 12 denotes a reference axis ray which passes from the aperture center of the stop 11 to the center of a final image forming plane, and reference numerals 13, 14, 15 and 16 denote optical units each having reflecting surfaces (not shown) which are inclined with respect to the reference axis ray 12. (In the present specification, reflecting surfaces which are inclined with respect to the reference axis ray are called off-axial reflecting surfaces, and optical units having such off-axial reflecting surfaces are called off-axial optical units.) The first optical unit 13, the second optical unit 14, the third optical unit 15 and the fourth optical unit 16 are arranged along the reference axis ray in that order from an object side. Reference numeral 17 denotes a final image forming plane (in which the image pickup surface of an image pickup medium such as a CCD is located).

The reference axis ray 12 passes through the aperture center of the stop 11, then passes through the first to fourth optical units 13 to 16 in the form of a ray which is bent by the off-axial reflecting surfaces, and then reaches the center of the final image forming plane 17. Each of the first optical unit 13 and the fourth optical unit 16 is an off-axial optical unit through which the reference axis ray 12 passes with the entering and exiting directions thereof being the same as each other, while each of the second optical unit 14 and the third optical unit 15 is an off-axial optical unit through which the reference axis ray 12 passes with the entering and exiting directions thereof being opposite to each other.

It is possible to realize a variable magnification optical system by making movable at least two optical units in the arrangement shown in FIG. 1. In the first embodiment, its magnification varying operation is realized by the movement of the first optical unit 13 and the third optical unit 15. The stop 11, the second optical unit 14, the fourth optical unit 16 and the final image forming plane 17 are physically fixed during the magnification varying operation. Thus, if the focal length of the first embodiment is varied from its wide-angle end toward its telephoto end, with the movement of the first optical unit 13, the distance between the stop 11 and the first optical unit 13 becomes longer, while the distance between the first optical unit 13 and the second optical unit 14 becomes shorter. With the movement of the third optical unit 15, the distance between the second optical unit 14 and the third optical unit 15 and the distance between the third optical unit 15 and the fourth optical unit 16 become longer. With the movement of the third optical unit 15, the entire optical path length from the stop 11 to the final image forming plane 17 becomes longer.

Figure 2:
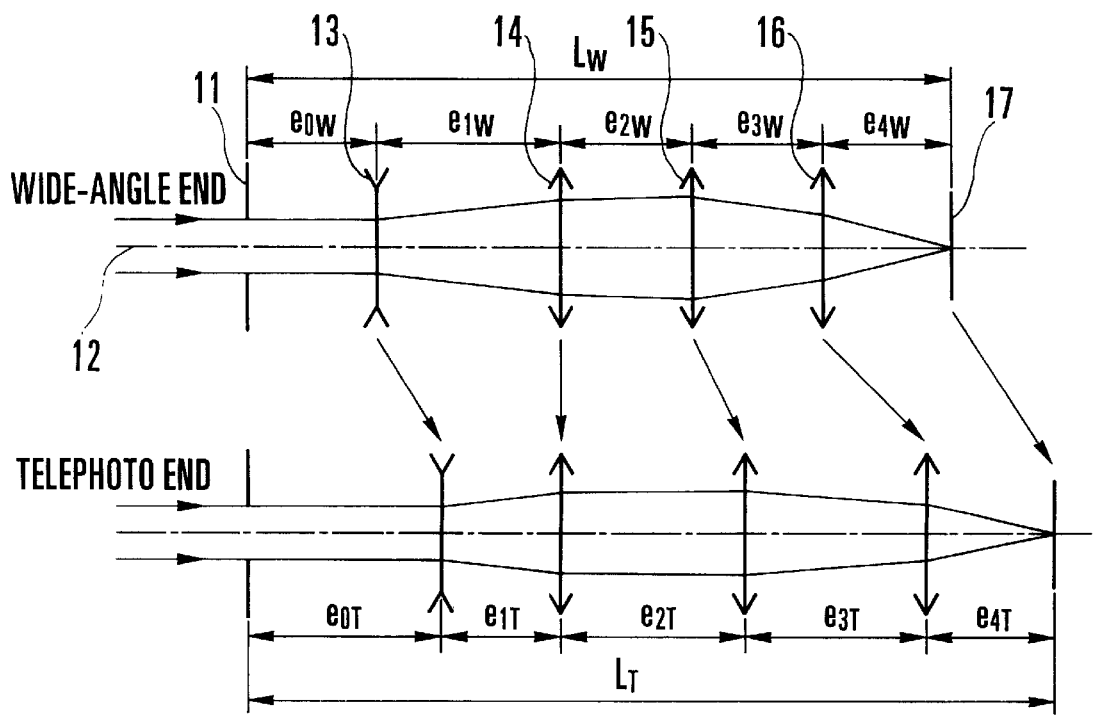
FIG. 2 is an explanatory view showing the first embodiment in the form of a coaxial system.

FIG. 2 is an explanatory view showing the first embodiment in the form of a coaxial system. In FIG. 2, letting $e_{0W}$, $e_{1W}$, $e_{2W}$, $e_{3W}$, and $e_{4W}$ represent individual optical unit-to-optical unit distances relative to the wide-angle end, letting $e_{0T}$, $e_{1T}$, $e_{2T}$, $e_{3T}$ and $e_{4T}$ represent the corresponding optical unit-to-optical unit distances relative to the telephoto end, and letting d1 and d3 represent the respective amounts of movements of the first optical unit 13 and the third optical unit 15, the following relations are obtained:

$e_{0T} = e_{0W} + d1$, $e_{1T} = e_{1W} - d1$, $e_{2T} = e_{2W} + d3$, $e_{3T} = e_{3W} + d3$, $e_{4T} = e_{4W}$.

Therefore, an entire optical path length $L_T$ for the telephoto end is expressed by the following equation by using an entire optical path length $L_W$ for the wide-angle end:

$L_T = L_W + 2 \cdot d3$.

Accordingly, in the first embodiment, although the final image forming plane 17 is physically fixed, as the focal length is varied from the wide-angle end toward the telephoto end, the entire optical path length becomes longer. As described above, since the optical unit through which the reference axis ray 12 passes with the entering and exiting directions thereof differing from each other by 180° is used as the third optical unit 15, the variable magnification optical system can be constructed such that the second optical unit 14, the fourth optical unit 16 and the final image forming plane 17 are fixed, whereas two optical units, i.e., the first optical unit 13 and the third optical unit 15, are physically movable. Accordingly, the optical arrangement of the variable magnification optical system is such that three optical units are movable and an image plane position is variable, as shown in FIG. 2.

Furthermore, the variable magnification optical system of the first embodiment can be made thin as a whole because the stop 11 is disposed on the object side and an image is relayed to the final image forming plane 17 through the formation of intermediate images in the optical path. Specifically, the first optical unit 13 is formed as a front stop type of objective optical system which forms an intermediate image having an image size not larger than approximately an image size obtainable at the wide-angle end in the final image forming plane 17, and the succeeding optical units relay this intermediate image without enlarging the image size, whereby the entire variable magnification optical system can be made thin.

Figure 3:
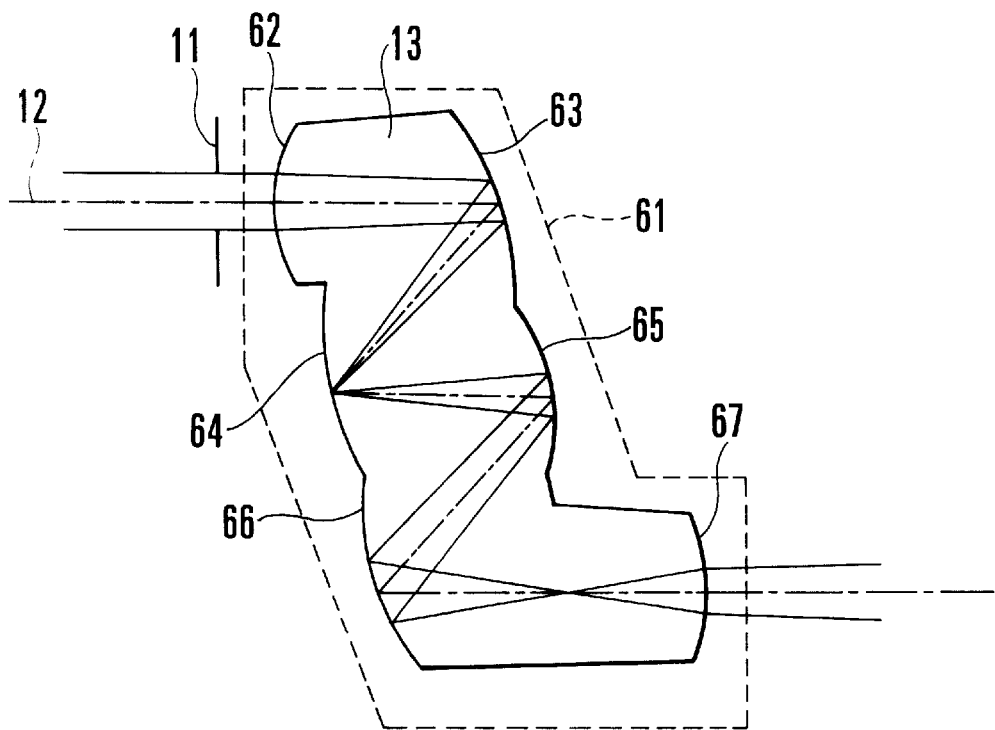
FIG. 3 is a view of the construction of a first optical unit of the first embodiment.
Figure 4:
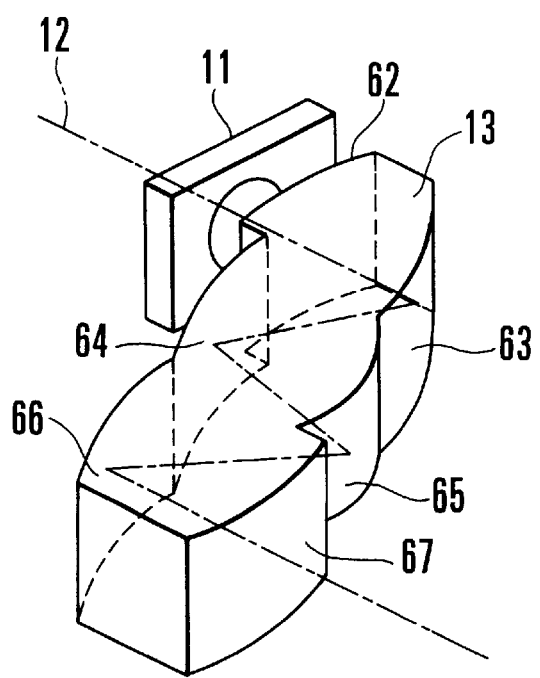
FIG. 4 is a perspective view of the first optical unit of the first embodiment.

FIG. 3 is a view showing the construction of the first optical unit 13 of the first embodiment. The first optical unit 13 includes a transparent body 61 on which two refracting surfaces and four internal reflecting surfaces are integrally formed. As shown in FIG. 3, the first optical unit 13 includes refracting surfaces 62 and 67 formed on the transparent body 61 and internal reflecting surfaces 63, 64, 65 and 66 formed on the transparent body 61, and the respective internal reflecting surfaces 63, 64, 65 and 66 are formed as reflecting mirrors by evaporation or other similar process. FIG. 4 is a perspective view of the first optical unit 13. Since all the reflecting surfaces are integrally formed in the above-described manner, the relative positional accuracy of each of the surfaces becomes high compared to an arrangement in which individual surfaces are independently formed, so that adjustment of the positions, inclinations or the like of the respective surfaces can be omitted. In addition, since members for supporting the reflecting surfaces are not needed, the required number of constituent components can be reduced.

A light beam passing through the stop 11 enters the first optical unit 13 through the refracting surface 62 along the reference axis ray 12, and exits from the refracting surface 67 after having been repeatedly reflected by the internal reflecting surfaces 63, 64, 65 and 66. During this time, a first intermediate image is formed in the vicinity of the reflecting surface 64. In other words, the stop 11, the refracting surface 62 and the reflecting surface 63 constitute a front stop type of objective system which uses, as an image plane, a plane in which the first intermediate image is formed.

The first intermediate image is relayed as a second intermediate image by the reflecting surfaces 65 and 66. The first optical unit 13 of the first embodiment is, therefore, formed as a thin off-axial optical unit in which the first intermediate image is formed immediately after the stop 11 and is relayed from one reflecting surface to another. Incidentally, the term "thin" or similar expressions used herein mean that the thickness taken in the direction perpendicular to the surface of the sheet of FIG. 3 is small.

In the first embodiment, if a parallel light beam is made incident on the refracting surface 62 of the first optical unit 13, the incident light beam exits from the refracting surface 67 as a diverging light beam. In other words, the transparent body 61 functions as an optical unit which relays an image by a compact optical arrangement consisting of concave reflecting surfaces each having a positive refractive power, and which has a negative refractive power as a whole.

In addition, each of the second optical unit 14, the third optical unit 15 and the fourth optical unit 16 is also formed as a transparent body which has two refracting surfaces and a plurality of internal reflecting surfaces similarly to the first optical unit 13. Accordingly, although, in the explanatory view of FIG. 2, the first embodiment is shown as an optical arrangement which does not have intermediate images, the first embodiment in practice realizes the magnification varying operation shown in FIG. 2, by relaying an image by forming intermediate images in the respective optical units.

Furthermore, the first embodiment uses, as the second and third optical units, off-axial optical units through each of which the reference axis ray passes with the entering and exiting directions thereof being opposite to each other. Accordingly, the entire length of the variable magnification optical system is made extremely small in the direction of the entering reference axis.

Figure 5:
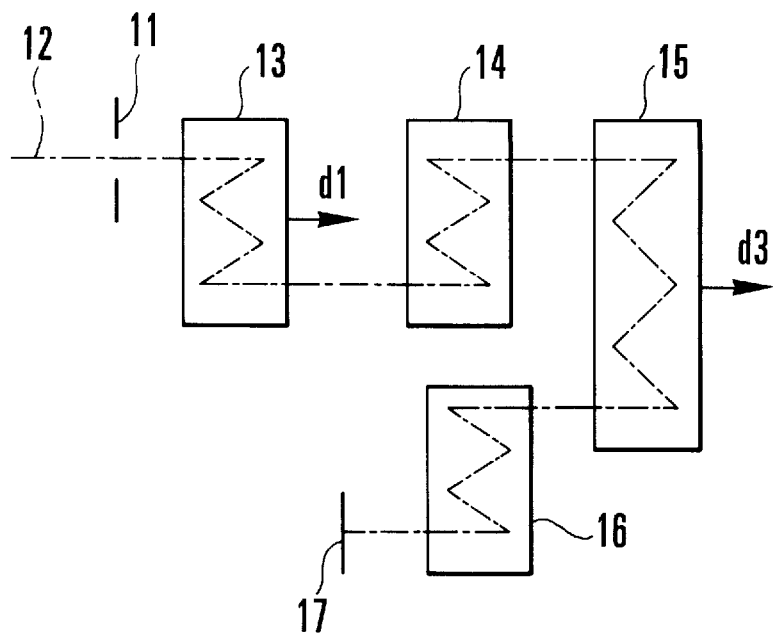
FIG. 5 is a view of the basic arrangement of a second embodiment of the variable magnification optical system according to the present invention.

FIG. 5 is a view of the basic arrangement of a second embodiment of the variable magnification optical system according to the present invention. The second embodiment differs from the first embodiment in that the aforesaid optical unit used as the second optical unit is replaced with another optical unit through which the reference axis passes with the entering and exiting directions thereof the same as each other. Since the second embodiment is arranged to perform its magnification varying operation with the second optical unit fixed, the coaxial system of the second embodiment is similar to that of the first embodiment as shown in FIG. 2.

Figure 6:
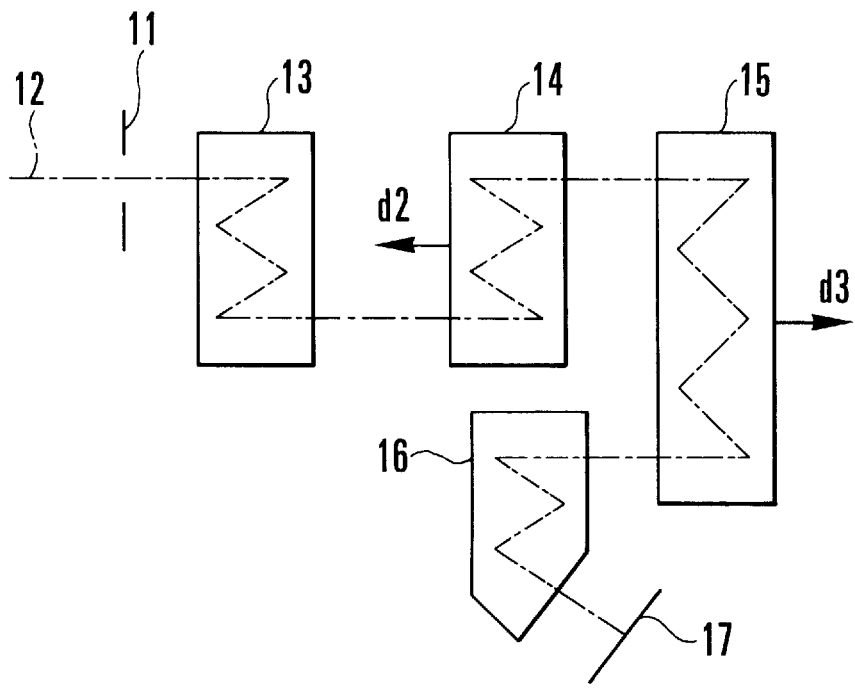
FIG. 6 is a view of the basic arrangement of a third embodiment of the variable magnification optical system according to the present invention.

FIG. 6 is a view of the basic arrangement of a third embodiment of the variable magnification optical system according to the present invention. The third embodiment differs from the second embodiment in that the aforesaid optical unit used as the fourth optical unit is replaced with another optical unit whose entering and exiting reference axes have different directions inclined toward each other, and in that the third embodiment is arranged to perform its magnification varying operation while moving the second and third optical units.

Figure 7:
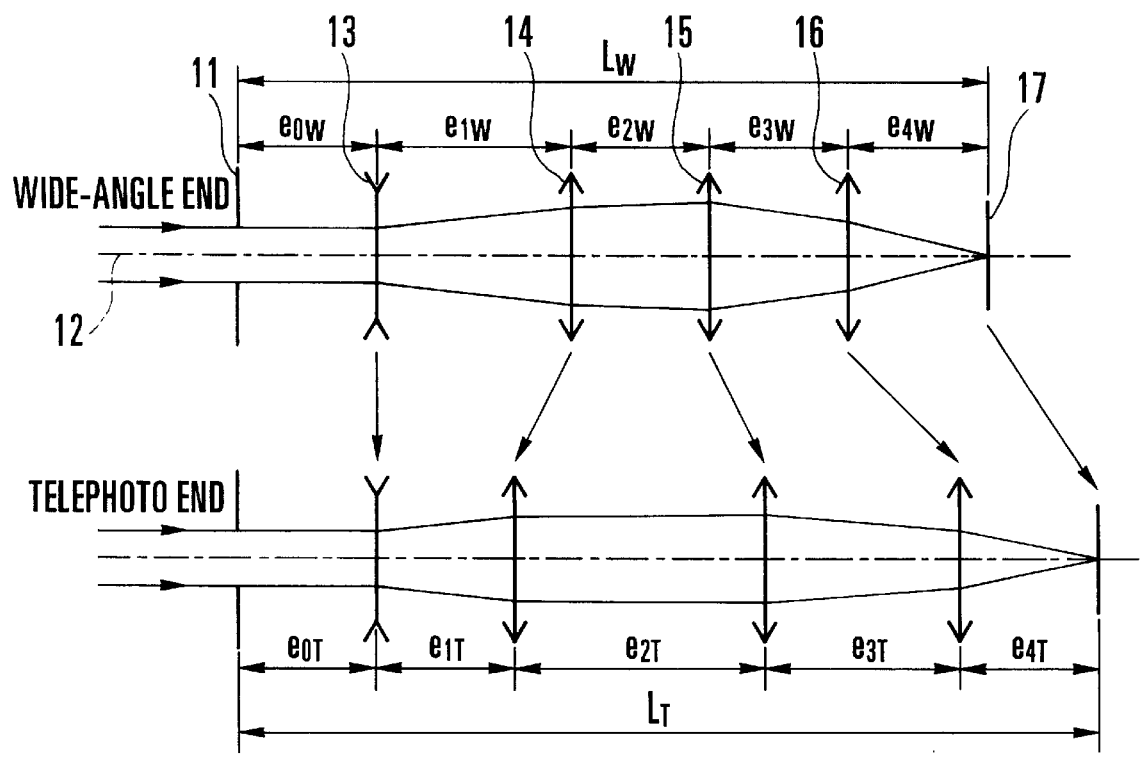
FIG. 7 is a an explanatory view showing the third embodiment in the form of a coaxial system.

FIG. 7 is an explanatory view showing the third embodiment in the form of a coaxial system. In FIG. 7, letting $e_{0W}$, $e_{1W}$, $e_{2W}$, $e_{3W}$ and $e_{4W}$ represent individual optical unit-to-optical unit distances relative to the wide-angle end, letting $e_{0T}$, $e_{1T}$, $e_{2T}$, $e_{3T}$ and $e_{4T}$ represent the corresponding optical unit-to-optical unit distances relative to the telephoto end, and letting d2 and d3 represent the respective amounts of movements of the second optical unit 14 and the third optical unit 15, the following relations are obtained:

$$e_{0T}=e_{0W},$$

$$e_{1T}=e_{1W}-d2,$$

$$e_{2T}=e_{2W}+d2+d3,$$

$$e_{3T}=e_{3W}+d3,$$

$$e_{4T}=e_{4W}.$$

Therefore, the entire optical path length $L_T$ for the telephoto end is expressed by the following equation by using the entire optical path length $L_W$ for the wide-angle end:

$$L_T=L_W+2\cdot d3.$$

Accordingly, in the third embodiment, although the final image forming plane 17 is physically fixed, as the focal length is varied from the wide-angle end toward the telephoto end, the entire optical path length becomes longer. In the variable magnification optical system of the third embodiment, the first optical unit 13, the fourth optical unit 16 and the final image forming plane 17 are fixed, whereas two optical units, i.e., the second optical unit 14 and the third optical unit 15, are movable. However, the optical arrangement of the variable magnification optical system is such that three optical units, i.e., the second optical unit 14, the third optical unit 15 and the fourth optical unit 16, are movable and an image plane position is variable.

In addition, since the fourth optical unit 16 is fixed during the magnification varying operation, the third embodiment can be constructed so that the entering and exiting directions of the reference axis ray have arbitrary angles. With this construction, it is possible to enhance the degree of freedom of layout of a solid-state image pickup element or the like to be arranged in the final image forming plane 17; for example, it is possible to arrange a CCD in a direction different from the direction of the photographing axis of the optical system.

Prior to the description of numerical examples of the present invention, reference will be made to terms which are herein used to express various constituent elements of the numerical examples, and matters common to all the numerical examples.

Figure 8:
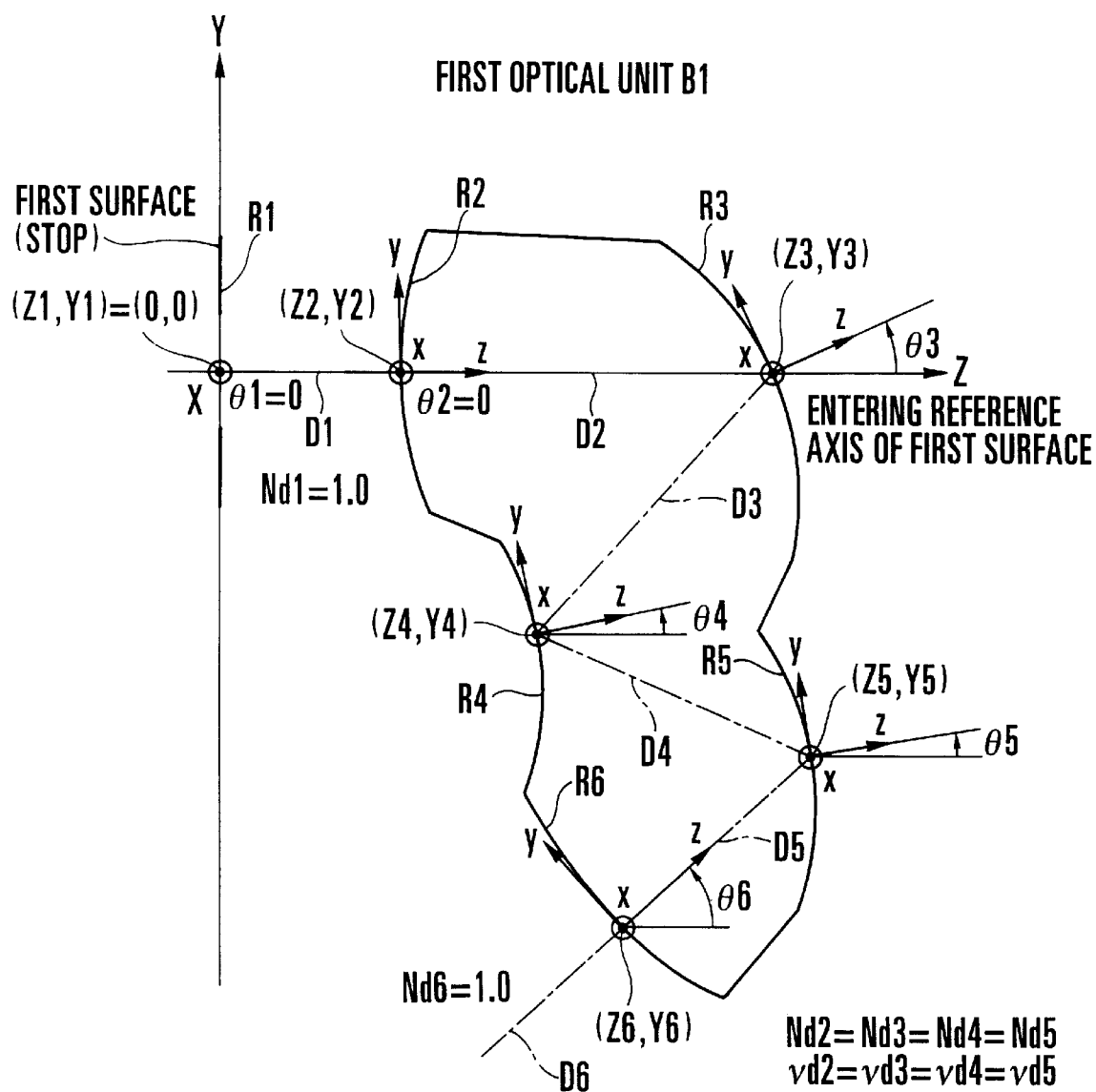
FIG. 8 is a view of a coordinate system for each of the embodiments of the present invention.

FIG. 8 is an explanatory view of a coordinate system which defines the constituent data of an optical system according to the present invention. In each of the numerical examples of the present invention, the i-th surface is a surface which lies at the i-th position numbered from an object side from which a ray travels toward an image plane (the ray is shown by dot-dashed lines in FIG. 8 and is hereinafter referred to as the reference axis ray).

In FIG. 8, a first surface R1 is a stop, a second surface R2 is a refracting surface coaxial with the first surface R1, a third surface R3 is a reflecting surface which is tilted with respect to the second surface R2, a fourth surface R4 is a reflecting surface which is shifted and tilted with respect to the third surface R3, a fifth surface R5 is a reflecting surface which is shifted and tilted with respect to the fourth surface R4, and a sixth surface R6 is a refracting surface which is shifted and tilted with respect to the fifth surface R5. All of the second surface R2 to the sixth surface R6 are arranged on one optical unit composed of a medium such as glass or plastics. In FIG. 8, such optical unit is shown as a first optical unit B1.

Accordingly, in the arrangement shown in FIG. 8, the medium between an object plane (not shown) and the second surface R2 is air, the second surface R2 to the sixth surface R6 are arranged on a certain common medium, and the medium between the sixth surface R6 and a seventh surface R7 (not shown) is air.

Since the optical system according to the present invention is an off-axial optical system, the surfaces which constitute part of the optical system do not have a common optical axis. For this reason, in each of the numerical examples of the present invention, an absolute coordinate system is set, the origin of which is the central point of an effective ray diameter at the first surface which is the stop. In the present invention, each axis of the absolute coordinate system is defined as follows:

Z axis: reference axis which passes through the origin and extends to the second surface R2;

Y axis: straight line which passes through the origin and makes an angle of 90° with the Z axis in the counter-clockwise direction in a tilting plane (on the surface of the sheet of FIG. 8); and X axis: straight line which passes through the origin and is perpendicular to each of the Z and Y axes (perpendicular to the surface of the sheet of FIG. 8).

If the surface shape of the i-th surface which constitutes part of the optical system is to be expressed, it is possible to more readily understand and recognize such surface shape by setting a local coordinate system the origin of which is a point at which the reference axis intersects with the i-th surface, and expressing the surface shape of the i-th surface by using the local coordinate system than by expressing the surface shape of the i-th surface by using the absolute coordinate system. Accordingly, in some numerical examples of the present invention the constituent data of which are shown herein, the surface shape of the i-th surface is expressed by its local coordinate system.

The tilting angle of the i-th surface in the Y, Z plane is expressed by an angle θi (unit: degree) which shows a positive value in the counterclockwise direction with respect to the Z axis of the absolute coordinate system. Accordingly, in each of the numerical examples of the present invention, the origins of the local coordinate systems of the respective surfaces are located on the Y, Z plane, as shown in FIG. 8. The tilting or shifting of the surfaces is absent in the X, Z plane or the X, Y plane. In addition, the y and z axes of the local coordinates (x, y, z) of the i-th surface are inclined by the angle θi in the Y, z plane with respect to the absolute coordinate system (X, Y, Z). Specifically, the x, y and z axes of the local coordinates (x, y, z) are set in the follow manner:

z axis: straight line which passes through the origin of the local coordinates and makes the angle θi with the Z direction of the absolute coordinate system in the counterclockwise direction in the Y, Z plane;

y axis: straight line which passes through the origin of the local coordinates and makes an angle of 90° with the z axis of the local coordinates in the counterclockwise direction in the Y, Z plane; and x axis: straight line which passes through the origin of the local coordinates and is perpendicular to the Y, Z plane.

The optical system of each of the numerical examples of the present invention varies its entire focal length (magnification) by the movement of a plurality of optical units. Regarding each of the numerical examples which have the numerical data shown herein, the cross section of its optical system and the numerical data are shown with respect to three positions, i.e., a wide-angle end (W), a telephoto end (T) and a middle position (M).

If the optical unit shown in FIG. 8 moves in the Y, Z plane, the origin (Yi, Zi) of each of the local coordinate systems which represent the positions of the respective surfaces takes on a different value for each varied magnification position. However, in the case of the numerical examples of the present invention, since the optical unit is assumed to move in only the Z direction for the purpose of variation of magnification, the coordinate value Zi is expressed by Zi(W), Zi(M) and Zi(T) in the order of the wide-angle end, the middle position and the telephoto end which respectively correspond to three states to be taken by the optical system.

Incidentally, the coordinate values of each of the surfaces represent those obtained at the wide-angle end, and each of the middle position and the telephoto end is expressed as a difference between the coordinate values obtained at the wide-angle end and the coordinate values obtained at the respective one of the middle position and the telephoto end. Specifically, letting "a" and "b" be the respective amounts of movements of the optical unit at the middle position (M) and the telephoto end (T) with respect to the wide-angle end (W), these amounts of movements are expressed by the following equations:

Zi(M)=Zi(W)+a,

Zi(T)=Zi(W)+b.

If all the surfaces move in their Z plus directions, the signs of "a" and "b" are positive, whereas if they move in their Z minus directions, the signs of "a" and "b" are negative. A surface-to-surface distance Di which varies with these movements is a variable, and the values of the variable at the respective varied magnification positions are collectively shown on tables which will be referred to later.

Symbol Di indicates a scalar which represents the distance between the origin of the local coordinates of the i-th surface and that of the (i+1)-st surface. Symbols Ndi and υdi respectively indicate the refractive index and the Abbe number of the medium between the i-th surface and the (i+1)-st surface. In FIG. 8, each of the stop and the final image forming plane is shown as one plane surface.

Each of the numerical examples of the present invention has spheric surfaces and aspheric surfaces of rotational asymmetry. Each of the spheric surfaces has a spherical shape expressed by a radius of curvature $R_i$. The sign of the radius of curvature $R_i$ is plus if the center of curvature is located in the z-axis plus direction of the local coordinates, whereas if the center of curvature is located in the z-axis minus direction of the local coordinates, the sign of the radius of curvature $R_i$ is minus.

Each of the spheric surfaces has a shape expressed by the following equation:

$$z = \frac{(x^2+y^2)/R_i}{1+\{1-(x^2+y^2)/R_i^2\}^{1/2}}.$$

In addition, the optical system according to the present invention has at least one aspheric surface of rotational asymmetry, and its shape is expressed by the following equations:

$A = (a+b) \cdot (y^2 \cdot \cos^2 t + x^2),$ $B = 2a \cdot b \cdot \cos t [1 + \{(b-a) \cdot y \cdot \sin t/(2a \cdot b)\}$ $+ [1 + \{(b-a) \cdot y \cdot \sin t/(a \cdot b)\} - \{y^2/(a \cdot b)\}$ $- \{4a \cdot b \cdot \cos^2 t + (a+b)^2 \sin^2 t\} X^2/(4a^2 b^2 \cos^2 t)]^{1/2}].$ Thus, $z = A/B + C_{02}y^2 + C_{11}xy + C_{20}x^2 + C_{03}y^3 + C_{12}xy^2 + C_{21}x^2y +$
$C_{30}x^3 + C_{04}y^4 + C_{13}xy^3 + C_{22}x^2y^2 + C_{31}x^3y + C_{40}x^4 + C_{05}y^5 +$
$C_{14}xy^4 + C_{23}x^2y^3 + C_{32}x^3y^2 + C_{41}x^4y + C_{50}x^5 + C_{06}y^6 +$
$C_{15}xy^5 + C_{24}x^2y^4 + C_{33}x^3y^3 + C_{42}x^4y^2 + C_{51}x^5y + C_{60}x^6.$ In the above curved-surface equation, "A/B" represents the shape of a quadratic surface, and the curved-surface equation represents the shape of an aspheric surface of rotational asymmetry which is based on the quadratic surface. However, in each of the numerical examples of the present invention, the value of "A/B" in the above curved-surface equation is set to:

A/B=0.

This means a surface of rotational asymmetry based on a plane surface. Specifically, the following condition is established irrespective of the value of "t":

$a = b = \infty.$

The shape of each of the surfaces of rotational asymmetry is made symmetrical with respect to the Y, Z plane by using only the even-exponent terms regarding x in the above curved-surface equation and by setting the other odd-exponent terms to "0". Accordingly, in the present invention, the following relation is established among the surfaces of rotational asymmetry:

$C_{11}=C_{12}=C_{30}=C_{13}=C_{31}=C_{14}=C_{32}=C_{50}=C_{15}=C_{33}=C_{51}=0.$

A horizontal half-angle of view $u_Y$ is the maximum angle of view of a light beam incident on the first surface R1 in the Y, Z plane of FIG. 8, while a vertical half-angle of view ux is the maximum angle of view of a light beam incident on the first surface R1 in the X, Z plane of FIG. 8.

The brightness of the optical system is represented by an entrance pupil diameter. The effective image area in the image plane is represented by an image size. The image size is represented by a rectangular region having a horizontal size taken in the y direction of the local coordinate system and a vertical size taken in the x direction of the local coordinate system.

Regarding the numerical examples which are illustrated together with the constituent data, their respective lateral aberration charts are shown. Each of the lateral aberration charts shows the lateral aberrations of a light beam for the wide-angle end (W), the middle position (M) and the telephoto end (T), and the lateral aberrations are those of the light beam which is incident on the stop R1 at an angle of incidence which is defined by a horizontal angle of incidence and a vertical angle of incidence which are $(u_Y, u_X)$, $(0, u_X)$, $(-u_Y, u_X)$, $(u_Y, 0)$, $(0, 0)$ and $(-u_Y, 0)$, respectively. In each of the lateral aberration charts, the horizontal axis represents the height of incidence on the pupil, and the vertical axis represents the amount of aberration. In any of the numerical examples, since each of the surfaces basically has a shape symmetrical with respect to the Y, Z plane, the plus and minus directions of a vertical angle of view are the same in the lateral aberration chart. For this reason, the lateral aberration chart relative to the minus direction is omitted for the sake of simplicity.

The numerical examples are described below.

[Numerical Example 1]

Numerical Example 1 is a numerical example of the first embodiment and is a variable magnification optical system having a magnification variation ratio of approximately 3.0×. FIGS. 9, 10 and 11 are cross-sectional views taken in the Y, Z plane, showing the respective optical paths of Numerical Example 1 relative to the wide-angle end (W), the middle position (M) and the telephoto end

| | WIDE-ANGLE END | MIDDLE POSITION | TELEPHOTO END |
|---|---|---|---|
| HORIZONTAL HALF-ANGLE OF VIEW | 27.3 | 19.0 | 9.8 |
| VERTICAL HALF-ANGLE OF VIEW | 21.2 | 14.5 | 7.4 |
| APERTURE DIAMETER | 1.30 | 1.40 | 2.40 |

| i | Yi | Zi(W) | θi | Di | Ndi | νdi | |
|---|---|---|---|---|---|---|---|
| 1 | 0.00 | 0.00 | 0.00 | VARIABLE | 1 | | STOP |
| FIRST OPTICAL UNIT B1 | | | | | | | |
| 2 | 0.00 | 1.00 | 0.00 | 6.00 | 1.49171 | 57.40 | REFRACTING SURFACE |
| 3 | 0.00 | 7.00 | 30.00 | 7.30 | 1.49171 | 57.40 | REFLECTING SURFACE |
| 4 | −6.32 | 3.35 | 30.00 | 7.10 | 1.49171 | 57.40 | REFLECTING SURFACE |
| 5 | −6.32 | 10.45 | 30.00 | 7.60 | 1.49171 | 57.40 | REFLECTING SURFACE |
| 6 | −12.90 | 6.65 | 30.00 | 10.00 | 1.49171 | 57.40 | REFLECTING SURFACE |
| 7 | −12.90 | 16.65 | 0.00 | VARIABLE | 1 | | REFRACTING SURFACE |
| SECOND OPTICAL UNIT B2 | | | | | | | |
| 8 | −12.90 | 20.02 | 0.00 | 5.00 | 1.49171 | 57.40 | REFRACTING SURFACE |
| 9 | −12.90 | 25.02 | −30.00 | 8.00 | 1.49171 | 57.40 | REFLECTING SURFACE |
| 10 | −5.98 | 21.02 | −15.00 | 8.00 | 1.49171 | 57.40 | REFLECTING SURFACE |
| 11 | −1.98 | 27.95 | 0.00 | 8.00 | 1.49171 | 57.40 | REFLECTING SURFACE |
| 12 | 2.02 | 21.02 | 15.00 | 8.00 | 1.49171 | 57.40 | REFLECTING SURFACE |
| 13 | 8.95 | 25.02 | 30.00 | 6.00 | 1.49171 | 57.40 | REFLECTING SURFACE |
| 14 | 8.95 | 19.02 | 0.00 | VARIABLE | 1 | | REFRACTING SURFACE |
| THIRD OPTICAL UNIT B3 | | | | | | | |
| 15 | 8.95 | 16.44 | 0.00 | 6.00 | 1.49171 | 57.40 | REFRACTING SURFACE |
| 16 | 8.95 | 10.44 | 30.00 | 8.00 | 1.49171 | 57.40 | REFLECTING SURFACE |
| 17 | 15.88 | 14.44 | 15.00 | 8.00 | 1.49171 | 57.40 | REFLECTING SURFACE |
| 18 | 19.88 | 7.51 | 0.00 | 8.00 | 1.49171 | 57.40 | REFLECTING SURFACE |
| 19 | 23.88 | 14.44 | −15.00 | 8.00 | 1.49171 | 57.40 | REFLECTING SURFACE |
| 20 | 30.81 | 10.44 | −30.00 | 6.00 | 1.49171 | 57.40 | REFLECTING SURFACE |
| 21 | 30.81 | 16.44 | 0.00 | VARIABLE | 1 | | REFRACTING SURFACE |
| FOURTH OPTICAL UNIT B4 | | | | | | | |
| 22 | 30.81 | 18.44 | 0.00 | 6.00 | 1.49171 | 57.40 | REFRACTING SURFACE |
| 23 | 30.81 | 24.44 | 30.00 | 7.00 | 1.49171 | 57.40 | REFLECTING SURFACE |
| 24 | 24.75 | 20.94 | 30.00 | 7.00 | 1.49171 | 57.40 | REFLECTING SURFACE |
| 25 | 24.75 | 27.94 | 30.00 | 7.00 | 1.49171 | 57.40 | REFLECTING SURFACE |
| 26 | 18.68 | 24.44 | 30.00 | 5.00 | 1.49171 | 57.40 | REFLECTING SURFACE |
| 27 | 18.68 | 29.44 | 0.00 | 5.03 | 1 | | REFRACTING SURFACE |
| 28 | 18.68 | 34.47 | 0.00 | | 1 | | IMAGE PLANE |

| | WIDE-ANGLE END | MIDDLE POSITION | TELEPHOTO END |
|---|---|---|---|
| D1 | 1.00 | 2.23 | 3.77 |
| D7 | 3.37 | 2.14 | 0.60 |
| D14 | 2.58 | 3.54 | 6.68 |
| D21 | 2.00 | 2.96 | 6.10 |
| R1 | Zi(M) = Zi(W) | | Zi(T) = Zi(W) |
| R2–R7 | Zi(M) = Zi(W) + 1.23 | | Zi(T) = Zi(W) + 2.77 |
| R8–R14 | Zi(M) = Zi(W) | | Zi(T) = Zi(W) |
| R15–R21 | Zi(M) = Zi(W) − 0.96 | | Zi(T) = Zi(W) − 4.10 |
| R22 | Zi(M) = Zi(W) | | Zi(T) = Zi(W) |

SPHERICAL SHAPE

| R2 | $R_2 = 8.000$ |
|---|---|
| R7 | $R_7 = -10.000$ |
| R8 | $R_8 = -12.000$ |
| R14 | $R_{14} = -14.930$ |
| R15 | $R_{15} = 7.534$ |

-continued

| | | | |
|---|---|---|---|
| R21 | $R_{21} = 30.000$ | | |
| R22 | $R_{22} = -30.000$ | | |
| R27 | $R_{27} = \infty$ | | |

ASPHERICAL SHAPE

| | | | |
|---|---|---|---|
| R3 | $C_{02} = -1.84196e-02$ | $C_{20} = -7.49223e-02$ | |
| | $C_{03} = 1.75470e-03$ | $C_{21} = -1.57189e-03$ | |
| | $C_{04} = 5.94563e-05$ | $C_{22} = -3.98339e-04$ | $C_{40} = 1.37324e-04$ |
| | $C_{05} = C_{23} = C_{41} = C_{06} = C_{24} = C_{42} = C_{60} = 0$ | | |
| R4 | $C_{02} = 2.96556e-02$ | $C_{20} = 4.88503e-02$ | |
| | $C_{03} = -8.02943e-04$ | $C_{21} = 6.76734e-03$ | |
| | $C_{04} = 2.69022e-05$ | $C_{22} = 3.13422e-04$ | $C_{40} = 1.00396e-04$ |
| | $C_{05} = C_{23} = C_{41} = C_{06} = C_{24} = C_{42} = C_{60} = 0$ | | |
| R5 | $C_{02} = -2.95072e-02$ | $C_{20} = -2.15280e-02$ | |
| | $C_{03} = 6.05545e-04$ | $C_{21} = -4.24169e-03$ | |
| | $C_{04} = -4.53458e-06$ | $C_{22} = 2.86891e-04$ | $C_{40} = 8.98952e-06$ |
| | $C_{05} = C_{23} = C_{41} = C_{06} = C_{24} = C_{42} = C_{60} = 0$ | | |
| R6 | $C_{02} = 5.05444e-02$ | $C_{20} = 3.03003e-02$ | |
| | $C_{03} = -1.20403e-03$ | $C_{21} = 1.08510e-03$ | |
| | $C_{04} = 1.95998e-04$ | $C_{22} = -4.03312e-05$ | $C_{40} = 4.87487e-05$ |
| | $C_{05} = C_{23} = C_{41} = C_{06} = C_{24} = C_{42} = C_{60} = 0$ | | |
| R9 | $C_{02} = -3.53929e-02$ | $C_{20} = -3.95966e-02$ | |
| | $C_{03} = 1.47857e-04$ | $C_{21} = -1.11417e-03$ | |
| | $C_{04} = -5.70566e-05$ | $C_{22} = -4.73975e-05$ | $C_{40} = -1.66378e-06$ |
| | $C_{05} = C_{23} = C_{41} = C_{06} = C_{24} = C_{42} = C_{60} = 0$ | | |
| R10 | $C_{02} = -1.04617e-02$ | $C_{20} = 8.31457e-03$ | |
| | $C_{03} = -4.68325e-04$ | $C_{21} = 1.55415e-03$ | |
| | $C_{04} = -5.96913e-05$ | $C_{22} = -1.16354e-04$ | $C_{40} = 3.36215e-04$ |
| | $C_{05} = C_{23} = C_{41} = C_{06} = C_{24} = C_{42} = C_{60} = 0$ | | |
| R11 | $C_{02} = -2.03948e-02$ | $C_{20} = -3.51213e-02$ | |
| | $C_{03} = 3.46097e-04$ | $C_{21} = -1.85980e-03$ | |
| | $C_{04} = -6.63284e-05$ | $C_{22} = -4.09294e-06$ | $C_{40} = -1.51654e-04$ |
| | $C_{05} = C_{23} = C_{41} = C_{06} = C_{24} = C_{42} = C_{60} = 0$ | | |
| R12 | $C_{02} = -5.77779e-03$ | $C_{20} = -3.26663e-02$ | |
| | $C_{03} = 3.63091e-04$ | $C_{21} = 5.52393e-03$ | |
| | $C_{04} = -4.29821e-05$ | $C_{22} = -8.05821e-04$ | $C_{40} = -7.62500e-04$ |
| | $C_{05} = C_{23} = C_{41} = C_{06} = C_{24} = C_{42} = C_{60} = 0$ | | |
| R13 | $C_{02} = -2.47289e-02$ | $C_{20} = -4.17078e-02$ | |
| | $C_{03} = 1.21829e-04$ | $C_{21} = -4.61281e-04$ | |
| | $C_{04} = -3.09189e-05$ | $C_{22} = -1.55476e-04$ | $C_{40} = -1.06806e-04$ |
| | $C_{05} = C_{23} = C_{41} = C_{06} = C_{24} = C_{42} = C_{60} = 0$ | | |
| R16 | $C_{02} = 2.33599e-02$ | $C_{20} = 1.67701e-02$ | |
| | $C_{03} = -4.44927e-04$ | $C_{21} = 2.63999e-03$ | |
| | $C_{04} = -1.36296e-04$ | $C_{22} = -1.19234e-04$ | $C_{40} = 1.71385e-04$ |
| | $C_{05} = C_{23} = C_{41} = C_{06} = C_{24} = C_{42} = C_{60} = 0$ | | |
| R17 | $C_{02} = 7.18854e-03$ | $C_{20} = 1.16537e-02$ | |
| | $C_{03} = 4.42743e-04$ | $C_{21} = -1.51419e-03$ | |
| | $C_{04} = 2.16865e-05$ | $C_{22} = -4.49103e-04$ | $C_{40} = 3.10151e-04$ |
| | $C_{05} = C_{23} = C_{41} = C_{06} = C_{24} = C_{42} = C_{60} = 0$ | | |
| R18 | $C_{02} = 2.86558e-02$ | $C_{20} = 3.49337e-02$ | |
| | $C_{03} = -4.11197e-04$ | $C_{21} = -5.00430e-05$ | |
| | $C_{04} = 5.95332e-05$ | $C_{22} = -1.33638e-05$ | $C_{40} = 9.82073e-05$ |
| | $C_{05} = C_{23} = C_{41} = C_{06} = C_{24} = C_{42} = C_{60} = 0$ | | |
| R19 | $C_{02} = 1.98100e-02$ | $C_{20} = 8.13819e-02$ | |
| | $C_{03} = -3.04175e-04$ | $C_{21} = -1.459256e-02$ | |
| | $C_{04} = 1.76749e-04$ | $C_{22} = -3.46364e-04$ | $C_{40} = 1.23300e-03$ |
| | $C_{05} = C_{23} = C_{41} = C_{06} = C_{24} = C_{42} = C_{60} = 0$ | | |
| R20 | $C_{02} = 2.04775e-02$ | $C_{20} = 3.55567e-02$ | |
| | $C_{03} = -3.42167e-04$ | $C_{21} = -6.98702e-04$ | |
| | $C_{04} = 1.36820e-05$ | $C_{22} = -2.14250e-05$ | $C_{40} = 4.80187e-05$ |
| | $C_{05} = C_{23} = C_{41} = C_{06} = C_{24} = C_{42} = C_{60} = 0$ | | |
| R23 | $C_{02} = -2.23268e-02$ | $C_{20} = -4.16684e-02$ | |
| | $C_{03} = 9.98918e-04$ | $C_{21} = -7.78619e-04$ | |
| | $C_{04} = -9.69924e-05$ | $C_{22} = 5.44433e-05$ | $C_{40} = 3.18729e-04$ |
| | $C_{05} = C_{23} = C_{41} = C_{06} = C_{24} = C_{42} = C_{60} = 0$ | | |
| R24 | $C_{02} = 6.96658e-02$ | $C_{20} = 4.97733e-02$ | |
| | $C_{03} = -1.63344e-03$ | $C_{21} = 5.97223e-03$ | |
| | $C_{04} = 2.33147e-05$ | $C_{22} = -2.69556e-04$ | $C_{40} = -2.85668e-03$ |
| | $C_{05} = C_{23} = C_{41} = C_{06} = C_{24} = C_{42} = C_{60} = 0$ | | |
| R25 | $C_{02} = -1.31495e-02$ | $C_{20} = -2.32040e-02$ | |
| | $C_{03} = 2.20965e-03$ | $C_{21} = -1.26858e-03$ | |
| | $C_{04} = 1.56158e-04$ | $C_{22} = 1.60767e-04$ | $C_{40} = -9.20673e-05$ |
| | $C_{05} = C_{23} = C_{41} = C_{06} = C_{24} = C_{42} = C_{60} = 0$ | | |
| R26 | $C_{02} = 2.35321e-02$ | $C_{20} = 2.57337e-02$ | |
| | $C_{03} = 5.82591e-04$ | $C_{21} = 2.88621e-04$ | |
| | $C_{04} = 3.82361e-05$ | $C_{22} = 1.15892e-04$ | $C_{40} = 2.65866e-05$ |
| | $C_{05} = C_{23} = C_{41} = C_{06} = C_{24} = C_{42} = C_{60} = 0$ | | |

The construction of Numerical Example 1 will be described in order from the object side. The first surface R1 is an aperture plane. The first optical unit B1 is formed as one transparent body on which are formed the second surface R2 (entrance refracting surface), the third to sixth surfaces R3 to R6 each of which is a decentered curved internal reflecting surface, and the seventh surface R7 (exit refracting surface). The second optical unit B2 is formed as one transparent body on which are formed the eighth surface R8 (entrance refracting surface), the ninth to thirteenth surfaces R9 to R13 each of which is a decentered curved internal reflecting surface, and the fourteenth surface R14 (exit refracting surface). The third optical unit B3 is formed as one transparent body on which are formed the fifteenth surface R15 (entrance refracting surface), the sixteenth to twentieth surfaces R16 to R20 each of which is a decentered curved internal reflecting surface, and the twenty-first surface R21 (exit refracting surface). The fourth optical unit B4 is formed as one transparent body on which are formed the twenty-second surface R22 (entrance refracting surface), the twenty-third to twenty-sixth surfaces R23 to R26 each of which is a decentered curved internal reflecting surface, and the twenty-seventh surface R27 (exit refracting surface). The twenty-eighth surface R28 is a final image plane in which the image pickup surface of an image pickup device such as a CCD is positioned.

The optical units of Numerical Example 1 are four separate optical units which constitute a variable magnification optical system. The first and third optical units B1 and B3 are magnification varying optical units which respectively move to perform a magnification varying operation.

An image forming operation for an object lying at infinity will be described below. First, a light beam which has passed through the stop R1 enters the first optical unit B1. In the first optical unit B1, the light beam is refracted by the second surface R2, then reflected from surface to surface by the third surface R3 to the sixth surface R6, then refracted by the seventh surface R7, and then exits from the first optical unit B1. During this time, a first-order image is formed in the vicinity of the fourth surface R4, and a second-order image is formed between the sixth surface R6 and the seventh surface R7. A pupil is formed in the vicinity of the fifth surface R5.

Then, the light beam enters the second optical unit B2. In the second optical unit B2, the light beam is refracted by the eighth surface R8, then reflected from surface to surface by the ninth surface R9 to the thirteenth surface R13, then refracted by the fourteenth surface R14, and then exits from the second optical unit B2. During this time, a third-order image forming plane is formed between the tenth surface R10 and the eleventh surface R11 when the focal length is at the wide-angle end, or in the vicinity of the eleventh surface R10 when the focal length is at the telephoto end. A pupil is formed between the thirteenth surface R13 and the fourteenth surface R14.

Then, the light beam enters the third optical unit B3. In the third optical unit B3, the light beam is refracted by the fifteenth surface R15, then reflected from surface to surface by the sixteenth surface R16 to the twentieth surface R20, then refracted by the twenty-first surface R21, and then exits from the third optical unit B3. During this time, a fourth-order image forming plane is formed between the sixteenth surface R16 and the seventeenth surface R17 when the focal length is at the wide-angle end, or in the vicinity of the seventeenth surface R17 when the focal length is at the telephoto end. A pupil is formed in the vicinity of the nineteenth surface R19 when the focal length is at the wide-angle end.

Then, the light beam enters the fourth optical unit B4. In the fourth optical unit B4, the light beam is refracted by the twenty-second surface R22, then reflected from surface to surface by the twenty-third surface R23 to the twenty-sixth surface R26, then refracted by the twentyseventh surface R27, and then exits from the fourth optical unit B4. During this time, a fifth-order image forming plane is formed between the twenty-third surface R23 and the twenty-fourth surface R24. A pupil is formed in the vicinity of the twenty-fifth surface R25 when the focal length is at the wide-angle end.

Then, the light beam which has exited from the fourth optical unit B4 finally forms a sixth-order image on the twenty-eighth surface R28.

In Numerical Example 1, each of the first optical unit B1 and the fourth optical unit B4 is an off-axial optical unit whose entering reference axis and exiting reference axis are the same as each other in direction, whereas each of the second optical unit B2 and the third optical unit B3 is an off-axial optical unit whose entering reference axis and exiting reference axis differ from each other by 180° in direction.

The magnification varying operation based on the movement of the optical units will be described below. During the magnification varying operation, the stop R1, the second optical unit B2, the fourth optical unit B4 and the image plane R28 are fixed. As the focal length varies from the wide-angle end toward the telephoto end, the first optical unit B1 moves in the Z plus direction, while the third optical unit B3 moves in the Z minus direction. Thus, during the magnification varying operation from the wide-angle end toward the telephoto end, the distance between the first optical unit B1 and the second optical unit B2 is decreased, the distance between the second optical unit B2 and the third optical unit B3 is increased, and the distance between the third optical unit B3 and the fourth optical unit B4 is increased. In addition, as the focal length varies from the wide-angle end toward the telephoto end, the entire optical path length which extends from the first surface R1 to the twenty-eighth image plane R28 becomes longer.

Figure 12:
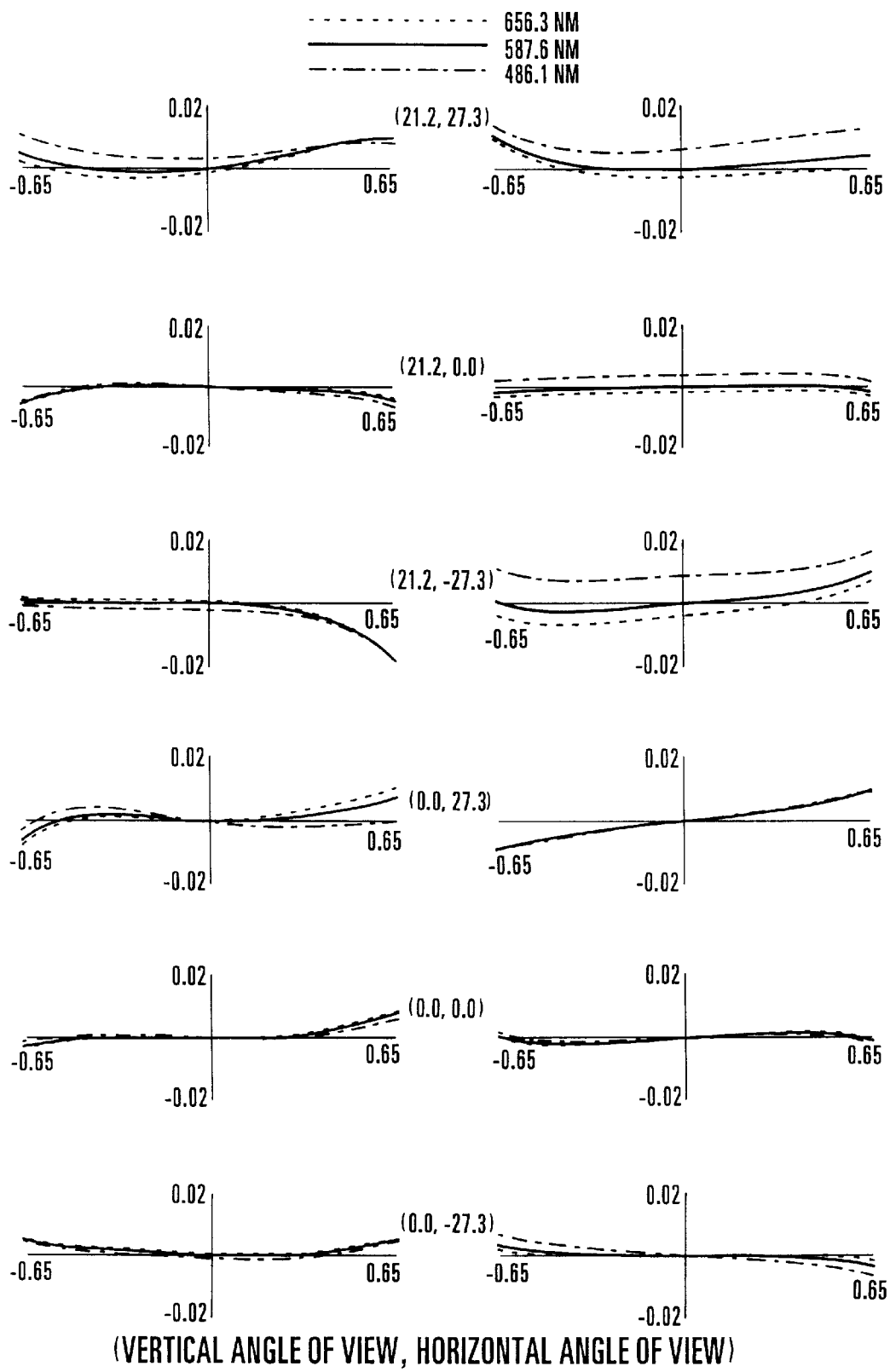
FIG. 12 is a lateral aberration chart of Numerical Example 1 relative to the wide-angle end.
Figure 13:
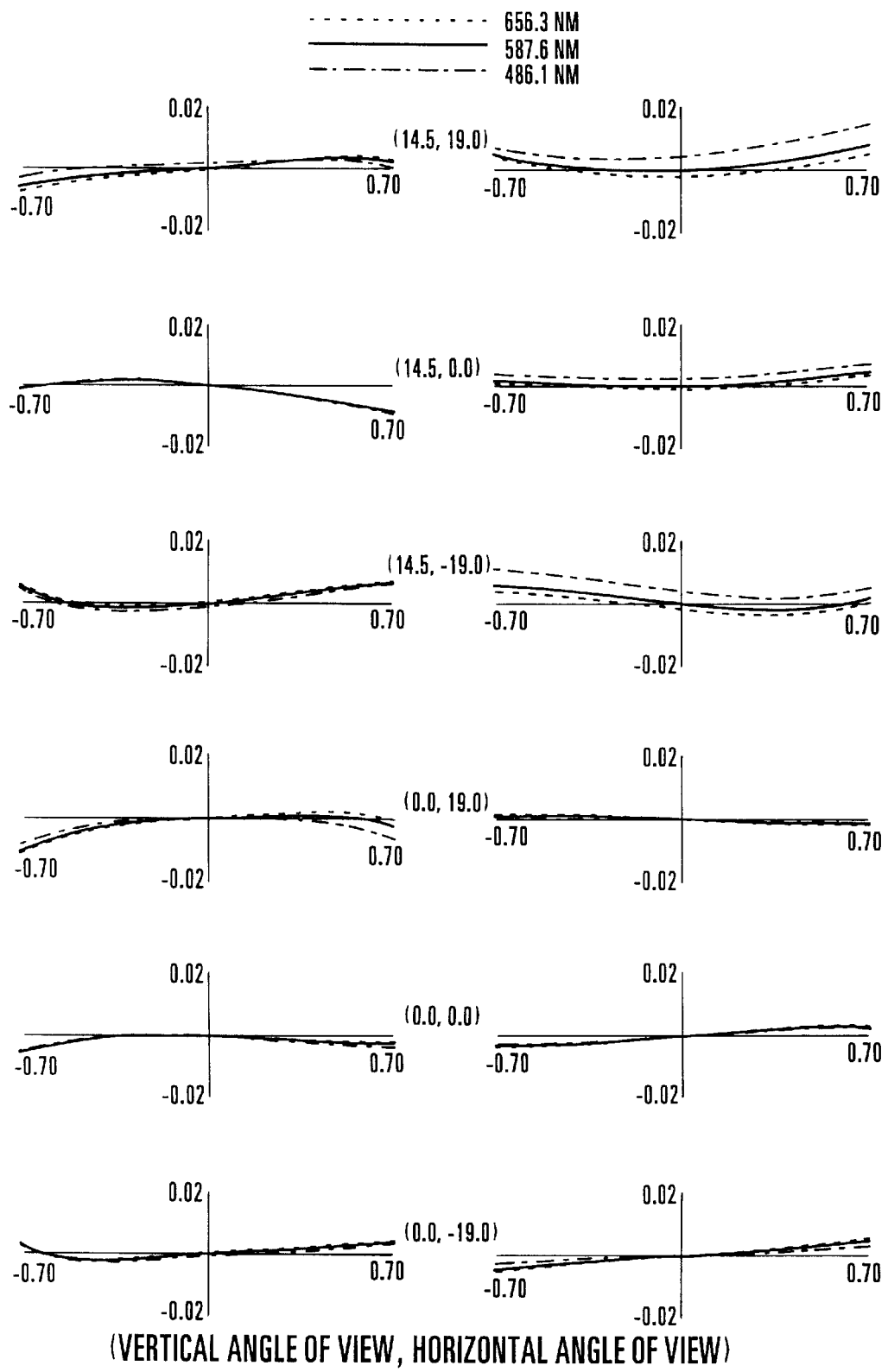
FIG. 13 is a lateral aberration chart of Numerical Example 1 relative to the middle position.
Figure 14:
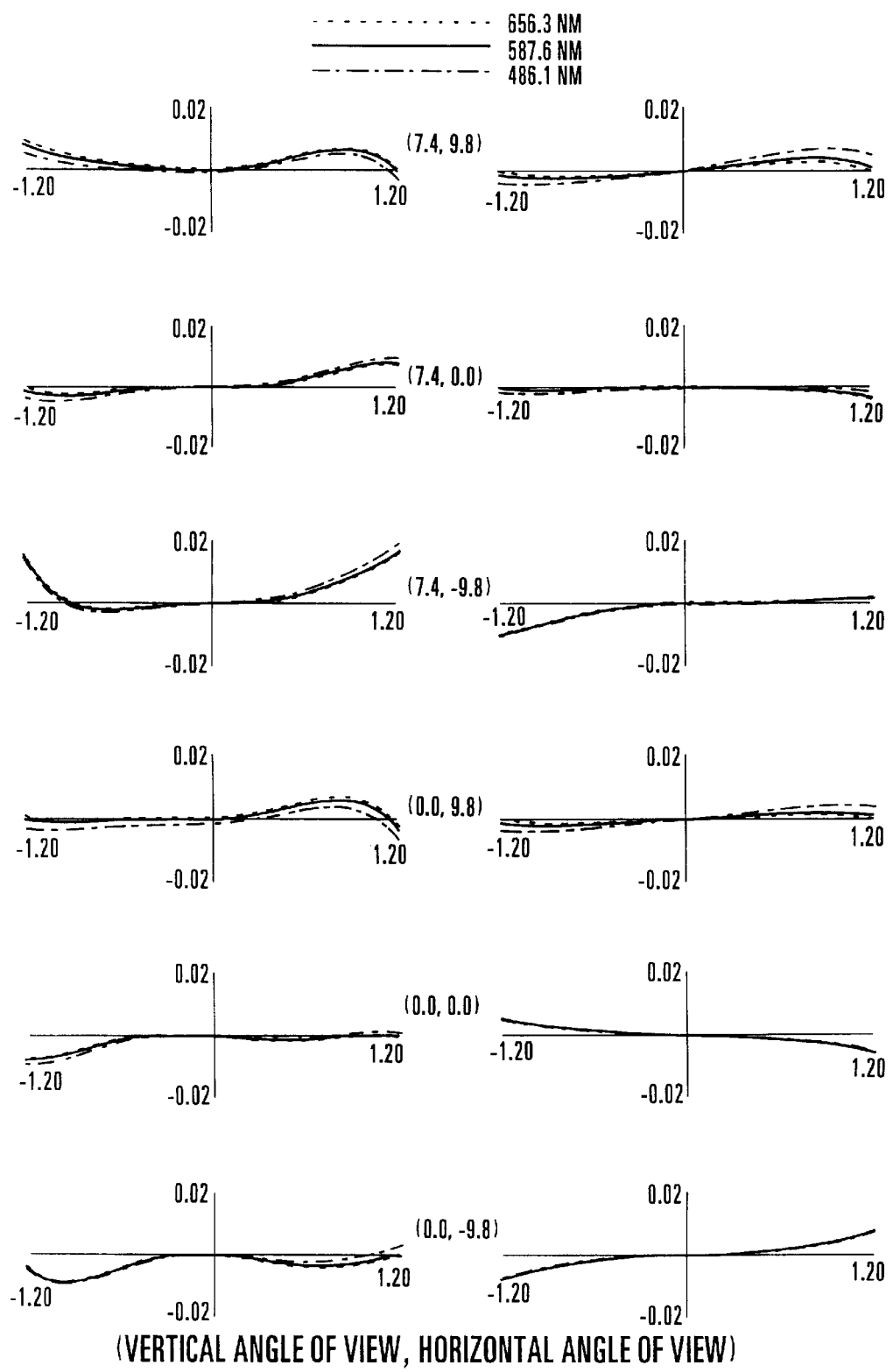
FIG. 14 is a lateral aberration chart of Numerical Example 1 relative to the telephoto end.

FIGS. 12, 13 and 14 show lateral aberration charts of Numerical Example 1 relative to the wide-angle end (W), the middle position (M) and the telephoto end (T), respectively. The respective lateral aberration charts show lateral aberrations in the Y and X directions, relative to six light beams which enter Numerical Example 1 at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 1 is capable of achieving well-balanced correction of aberration at each focal-length position.

In addition, the optical system of Numerical Example 1 is approximately 8.9 mm thick for an image size of 3.76 mm×2.82 mm. In Numerical Example 1, particularly because each of the optical units and the entire optical system has a small thickness and each of the optical units can be constructed by forming reflecting surfaces on predetermined sides of a plate-shaped transparent body, it is possible to readily construct a variable magnification optical system which is thin as a whole, by adopting a mechanism which causes two optical units to move along a surface of one base plate.

Incidentally, in Numerical Example 1, although a chromatic aberration is caused by a plurality of refracting surfaces, the curvature of each of the refracting surfaces is appropriately determined so that the chromatic aberration is corrected over the entire range of variation of magnification.

[Numerical Example 2]

Numerical Example 2 is a numerical example of the second embodiment and is a variable magnification optical system having a magnification variation ratio of approximately 3.0×. FIGS. 15, 16 and 17 are cross-sectional views taken in the Y, Z plane, showing the respective optical paths of Numerical Example 2 relative to the wide-angle end (W), the middle position (M) and the telephoto end (T).

|  | WIDE-ANGLE END | MIDDLE POSITION | TELEPHOTO END |
|---|---|---|---|
| HORIZONTAL HALF-ANGLE OF VIEW | 27.3 | 19.0 | 9.8 |
| VERTICAL HALF-ANGLE OF VIEW | 21.2 | 14.5 | 7.4 |
| APERTURE DIAMETER | 1.30 | 1.40 | 2.00 |

| i | Yi | Zi(W) | θi | Di | Ndi | νdi |  |
|---|---|---|---|---|---|---|---|
| 1 | 0.00 | 0.00 | 0.00 | VARIABLE | 1 |  | STOP |
| FIRST OPTICAL UNIT B1 | | | | | | | |
| 2 | 0.00 | 1.00 | 0.00 | 6.00 | 1.49171 | 57.40 | REFRACTING SURFACE |
| 3 | 0.00 | 7.00 | 30.00 | 8.00 | 1.49171 | 57.40 | REFLECTING SURFACE |
| 4 | -6.93 | 3.00 | 30.00 | 7.60 | 1.49171 | 57.40 | REFLECTING SURFACE |
| 5 | -6.93 | 10.60 | 30.00 | 8.00 | 1.49171 | 57.40 | REFLECTING SURFACE |
| 6 | -13.86 | 6.60 | 30.00 | 10.00 | 1.49171 | 57.40 | REFLECTING SURFACE |
| 7 | -13.86 | 16.60 | 0.00 | VARIABLE | 1 |  | REFRACTING SURFACE |
| SECOND OPTICAL UNIT B2 | | | | | | | |
| 8 | -13.86 | 20.17 | 0.00 | 6.00 | 1.49171 | 57.40 | REFRACTING SURFACE |
| 9 | -13.86 | 26.17 | -30.00 | 8.00 | 1.49171 | 57.40 | REFLECTING SURFACE |
| 10 | -6.93 | 22.17 | -30.00 | 7.60 | 1.49171 | 57.40 | REFLECTING SURFACE |
| 11 | -6.93 | 29.77 | -30.00 | 8.00 | 1.49171 | 57.40 | REFLECTING SURFACE |
| 12 | -0.00 | 25.77 | -30.00 | 6.00 | 1.49171 | 57.40 | REFLECTING SURFACE |
| 13 | -0.00 | 31.77 | 0.00 | VARIABLE | 1 |  | REFRACTING SURFACE |
| THIRD OPTICAL UNIT B3 | | | | | | | |
| 14 | 0.00 | 34.43 | 0.00 | 6.00 | 1.49171 | 57.40 | REFRACTING SURFACE |
| 15 | 0.00 | 40.00 | 30.00 | 6.00 | 1.49171 | 57.40 | REFLECTING SURFACE |
| 16 | -6.93 | 36.43 | 15.00 | 8.00 | 1.49171 | 57.40 | REFLECTING SURFACE |

-continued

| | | | | | | |
|---|---|---|---|---|---|---|
| 17 | −10.93 | 43.35 | 0.00 | 8.00 | 1.49171 | 57.40 RE-FLECTING SURFACE |
| 18 | −14.93 | 36.43 | −15.00 | 8.00 | 1.49171 | 57.40 RE-FLECTING SURFACE |
| 19 | −21.86 | 40.43 | −30.00 | 6.00 | 1.49171 | 57.40 RE-FLECTING SURFACE |
| 20 | −21.86 | 34.43 | 0.00 | VARI-ABLE | 1 | RE-FRACTING SURFACE |

FOURTH OPTICAL UNIT B4

| | | | | | | |
|---|---|---|---|---|---|---|
| 21 | −21.86 | 32.43 | 0.00 | 6.00 | 1.49171 | 57.40 RE-FRACTING SURFACE |
| 22 | −21.86 | 26.43 | −30.00 | 8.00 | 1.49171 | 57.40 RE-FLECTING SURFACE |
| 23 | −28.78 | 30.43 | −30.00 | 8.00 | 1.49171 | 57.40 RE-FLECTING SURFACE |
| 24 | −28.78 | 22.43 | −30.00 | 8.00 | 1.49171 | 57.40 RE-FLECTING SURFACE |
| 25 | −35.71 | 26.43 | −30.00 | 6.00 | 1.49171 | 57.40 RE-FLECTING SURFACE |
| 26 | −35.71 | 20.43 | 0.00 | 5.00 | 1 | 57.40 RE-FRACTING SURFACE |
| 27 | −35.71 | 15.43 | −0.00 | | 1 | IMAGE PLANE |

| | WIDE-ANGLE END | MIDDLE POSITION | TELEPHOTO END |
|---|---|---|---|
| D1 | 1.00 | 2.05 | 3.42 |
| D7 | 3.57 | 2.51 | 1.15 |
| D13 | 2.66 | 3.77 | 7.44 |
| D20 | 2.00 | 3.11 | 6.78 |
| R1 | $Zi(M) = Zi(W)$ | | $Zi(T) = Zi(W)$ |
| R2–R7 | $Zi(M) = Zi(W) + 1.05$ | | $Zi(T) = Zi(W) + 2.42$ |
| R8–R13 | $Zi(M) = Zi(W)$ | | $Zi(T) = Zi(W)$ |
| R14–R20 | $Zi(M) = Zi(W) + 1.11$ | | $Zi(T) = Zi(W) + 4.78$ |
| R21 | $Zi(M) = Zi(W)$ | | $Zi(T) = Zi(W)$ |

SPHERICAL SHAPE

R2  $R_2 = 10.000$
R7  $R_7 = -11.861$
R8  $R_8 = \infty$
R13 $R_{13} = 11.204$
R14 $R_{14} = -12.643$
R20 $R_{20} = -20.000$
R21 $R_{21} = 20.000$
R26 $R_{26} = \infty$

ASPHERICAL SHAPE

R3  $C_{02} = -1.83071e-02$  $C_{20} = -7.81991e-02$
    $C_{03} = 1.00274e-03$   $C_{21} = -1.73884e-03$
    $C_{04} = -7.10227e-05$  $C_{22} = -1.86390e-04$  $C_{40} = -6.72496e-04$
    $C_{05} = C_{23} = C_{41} = C_{06} = C_{24} = C_{42} = C_{60} = 0$
R4  $C_{02} = 2.72381e-02$   $C_{20} = 4.26943e-02$
    $C_{03} = -8.82988e-04$  $C_{21} = 4.59126e-03$
    $C_{04} = 6.66617e-05$   $C_{22} = 3.7.6662e-04$   $C_{40} = 2.96692e-06$
    $C_{05} = C_{23} = C_{41} = C_{06} = C_{24} = C_{42} = C_{60} = 0$
R5  $C_{02} = -2.62716e-02$  $C_{20} = -2.23830e-02$
    $C_{03} = -7.02940e-04$  $C_{21} = -3.78295e-03$
    $C_{04} = 1.75029e-04$   $C_{22} = 1.83213e-04$    $C_{40} = -2.10922e-05$
    $C_{05} = C_{23} = C_{41} = C_{06} = C_{24} = C_{42} = C_{60} = 0$
R6  $C_{02} = 4.77810e-02$   $C_{20} = 2.14543e-02$
    $C_{03} = -4.99909e-04$  $C_{21} = 1.22101e-03$
    $C_{04} = 6.61869e-05$   $C_{22} = 1.71877e-04$    $C_{40} = 1.53875e-05$
    $C_{05} = C_{23} = C_{41} = C_{06} = C_{24} = C_{42} = C_{60} = 0$
R9  $C_{02} = -2.91763e-02$  $C_{20} = -4.66323e-02$
    $C_{03} = -1.52824e-04$  $C_{21} = -1.57963e-03$
    $C_{04} = -2.19185e-05$  $C_{22} = -8.52576e-05$   $C_{40} = -1.19024e-04$
    $C_{05} = C_{23} = C_{41} = C_{06} = C_{24} = C_{42} = C_{60} = 0$
R10 $C_{02} = 1.07794e-02$   $C_{20} = 3.10239e-02$
    $C_{03} = 4.67064e-04$   $C_{21} = 3.84923e-03$
    $C_{04} = -8.60269e-05$  $C_{22} = 1.94541e-05$    $C_{40} = 8.55076e-04$
    $C_{05} = C_{23} = C_{41} = C_{06} = C_{24} = C_{42} = C_{60} = 0$
R11 $C_{02} = -1.84959e-02$  $C_{20} = 9.83021e-03$
    $C_{03} = 3.03425e-03$   $C_{21} = 1.19500e-02$
    $C_{04} = -5.45185e-04$  $C_{22} = -9.59618e-04$   $C_{40} = -8.76994e-04$
    $C_{05} = C_{23} = C_{41} = C_{06} = C_{24} = C_{42} = C_{60} = 0$
R12 $C_{02} = 3.37233e-02$   $C_{20} = 4.08856e-02$
    $C_{03} = -2.14185e-04$  $C_{21} = -3.66581e-04$
    $C_{04} = 7.32228e-05$   $C_{22} = 7.19114e-04$    $C_{40} = 8.78394e-05$
    $C_{05} = C_{23} = C_{41} = C_{06} = C_{24} = C_{42} = C_{60} = 0$
R15 $C_{02} = -2.82647e-02$  $C_{20} = -1.88719e-02$
    $C_{03} = -3.23209e-04$  $C_{21} = 3.46004e-03$
    $C_{04} = -8.76950e-05$  $C_{22} = -5.09783e-04$   $C_{40} = 2.25157e-05$
    $C_{05} = C_{23} = C_{41} = C_{06} = C_{24} = C_{42} = C_{60} = 0$
R16 $C_{02} = -1.61193e-02$  $C_{20} = 1.33403e-02$
    $C_{03} = -1.12604e-03$  $C_{21} = -2.03459e-03$
    $C_{04} = -1.75747e-04$  $C_{22} = 6.62986e-04$    $C_{40} = -1.98894e-04$
    $C_{05} = C_{23} = C_{41} = C_{06} = C_{24} = C_{42} = C_{60} = 0$
R17 $C_{02} = -2.42244e-03$  $C_{20} = -2.55567e-02$
    $C_{03} = -3.43843e-04$  $C_{21} = 2.07654e-03$
    $C_{04} = -6.04454e-06$  $C_{22} = 4.97534e-05$    $C_{40} = 3.19764e-06$
    $C_{05} = C_{23} = C_{41} = C_{06} = C_{24} = C_{42} = C_{60} = 0$
R18 $C_{02} = -1.26941e-02$  $C_{20} = -2.30778e-02$
    $C_{03} = 1.66627e-04$   $C_{21} = 3.30409e-03$
    $C_{04} = 1.18111e-05$   $C_{22} = -1.97257e-04$   $C_{40} = -8.99205e-05$
    $C_{05} = C_{23} = C_{41} = C_{06} = C_{24} = C_{42} = C_{60} = 0$
R19 $C_{02} = -1.30223e-02$  $C_{20} = -2.62924e-02$
    $C_{03} = -1.24818e-04$  $C_{21} = 1.25527e-03$
    $C_{04} = -2.15363e-05$  $C_{22} = -2.11593e-05$   $C_{40} = -2.20810e-05$
    $C_{05} = C_{23} = C_{41} = C_{06} = C_{24} = C_{42} = C_{60} = 0$
R22 $C_{02} = 1.87191e-02$   $C_{20} = 2.04438e-02$
    $C_{03} = -5.25072e-04$  $C_{21} = -8.28561e-04$
    $C_{04} = -2.68362e-09$  $C_{22} = -1.55911e-04$   $C_{40} = -1.93543e-05$
    $C_{05} = C_{23} = C_{41} = C_{06} = C_{24} = C_{42} = C_{60} = 0$
R23 $C_{02} = -8.56538e-03$  $C_{20} = -2.53293e-02$
    $C_{03} = -1.51347e-03$  $C_{21} = 3.19719e-03$
    $C_{04} = 1.56411e-04$   $C_{22} = -4.19337e-04$   $C_{40} = -2.45001e-04$
    $C_{05} = C_{23} = C_{41} = C_{06} = C_{24} = C_{42} = C_{60} = 0$
R24 $C_{02} = 4.67243e-03$   $C_{20} = 1.18004e-02$
    $C_{03} = 3.78642e-03$   $C_{21} = -2.52538e-03$
    $C_{04} = 9.76088e-04$   $C_{22} = 7.69723e-05$    $C_{40} = 3.16269e-04$
    $C_{05} = C_{23} = C_{41} = C_{06} = C_{24} = C_{42} = C_{60} = 0$
R25 $C_{02} = -2.84585e-02$  $C_{20} = -3.72900e-02$
    $C_{03} = -1.51587e-04$  $C_{21} = -4.32620e-04$
    $C_{04} = 6.14674e-06$   $C_{22} = -1.36123e-04$   $C_{40} = -1.33663e-05$
    $C_{05} = C_{23} = C_{41} = C_{06} = C_{24} = C_{42} = C_{60} = 0$

The construction of Numerical Example 2 will be described in order from the object side. The first surface R1 is an aperture plane. The first optical unit B1 is formed as one transparent body on which are formed the second surface R2 (entrance refracting surface), the third to sixth surfaces R3 to R6 each of which is a decentered curved internal reflecting surface, and the seventh surface R7 (exit refracting surface). The second optical unit B2 is formed as one transparent body on which are formed the eighth surface R8 (entrance refracting surface), the ninth to twelfth surfaces R9 to R12 each of which is a decentered curved internal reflecting surface, and the thirteenth surface R13 (exit refracting surface). The third optical unit B3 is formed as one transparent body on which are formed the fourteenth surface R14 (entrance refracting surface), the fifteenth to nineteenth surfaces R15 to R19 each of which is a decentered curved internal reflecting surface, and the twentieth surface R20 (exit refracting surface). The fourth optical unit B4 is formed as one transparent body on which are formed the twenty-first surface R21 (entrance refracting surface), the twenty-second to twenty-fifth surfaces R22 to R25 each of which is a decentered curved internal reflecting surface, and the twenty-sixth surface R26 (exit refracting surface).

The twenty-seventh surface R27 is a final image plane in which the image pickup surface of an image pickup device such as a CCD is positioned.

The optical units of Numerical Example 2 are four separate optical units which constitute a variable magnification optical system. The first and third optical units B1 and B3 are magnification varying optical units which respectively move to perform a magnification varying operation.

An image forming operation for an object lying at infinity will be described below. First, a light beam which has passed through the stop R1 enters the first optical unit B1. In the first optical unit B1, the light beam is refracted by the second surface R2, then reflected from surface to surface by the third surface R3 to the sixth surface R6, then refracted by the seventh surface R7, and then exits from the first optical unit B1. During this time, a first-order image is formed in the vicinity of the fourth surface R4, and a second-order image is formed between the sixth surface R6 and the seventh surface R7. A pupil is formed in the vicinity of the fifth surface R5.

Then, the light beam enters the second optical unit B2. In the second optical unit B2, the light beam is refracted by the eighth surface R8, then reflected from surface to surface by the ninth surface R9 to the twelfth surface R12, then refracted by the thirteenth surface R13, and then exits from the second optical unit B2. During this time, a third-order image forming plane is formed between the tenth surface R10 and the eleventh surface R11 when the focal length is at the wide-angle end, or in the vicinity of the eleventh surface R11 when the focal length is at the telephoto end. A pupil is formed in the vicinity of the twelfth surface R12.

Then, the light beam enters the third optical unit B3. In the third optical unit B3, the light beam is refracted by the fourteenth surface R14, then reflected from surface to surface by the fifteenth surface R15 to the nineteenth surface R19, then refracted by the twentieth surface R20, and then exits from the third optical unit B3. During this time, a fourth-order image forming plane is formed between the fourteenth surface R14 and the fifteenth surface R15 when the focal length is at the wide-angle end, or in the vicinity of the fifteenth surface R15 when the focal length is at the telephoto end. A pupil is formed in the vicinity of the eighteenth surface R18 when the focal length is at the wide-angle end, or in the vicinity of the seventeenth surface R17 when the focal length is at the telephoto end.

Then, the light beam enters the fourth optical unit B4. In the fourth optical unit B4, the light beam is refracted by the twenty-first surface R21, then reflected from surface to surface by the twenty-second surface R22 to the twenty-fifth surface R25, then refracted by the twenty-sixth surface R26, and then exits from the fourth optical unit B4. During this time, a fifth-order image forming plane is formed in the vicinity of the twenty-third surface R23. A pupil is formed in the vicinity of the twenty-fourth surface R24.

Then, the light beam which has exited from the fourth optical unit B4 finally forms a sixth-order image on the twenty-eighth surface R28.

In Numerical Example 2, each of the fir st optical unit B1, the second optical unit B2 and the fourth optical unit B4 is an off-axial optical unit whose entering reference axis and exiting reference axis are the same as each other in direction, whereas the third optical unit B3 is an off-axial optical unit whose entering reference axis and exiting reference axis differ from each other by 180° in direction.

The magnification varying operation based on the movement of the optical units will be described below. During the magnification varying operation, the stop R1, the second optical unit B2, the fourth optical unit B4 and the image plane R27 are fixed. As the focal length varies from the wide-angle end toward the telephoto end, the first optical unit B1 moves in the Z plus direction, while the third optical unit B3 moves in the Z plus direction. Thus, during the magnification varying operation from the wide-angle end toward the telephoto end, the distance between the first optical unit B1 and the second optical unit B2 is decreased, the distance between the second optical unit B2 and the third optical unit B3 is increased, and the distance between the third optical unit B3 and the fourth optical unit B4 is increased. In addition, as the focal length varies from the wide-angle end toward the telephoto end, the entire optical path length which extends from the first surface R1 to the twenty-seventh plane R27 becomes longer.

Figure 18:
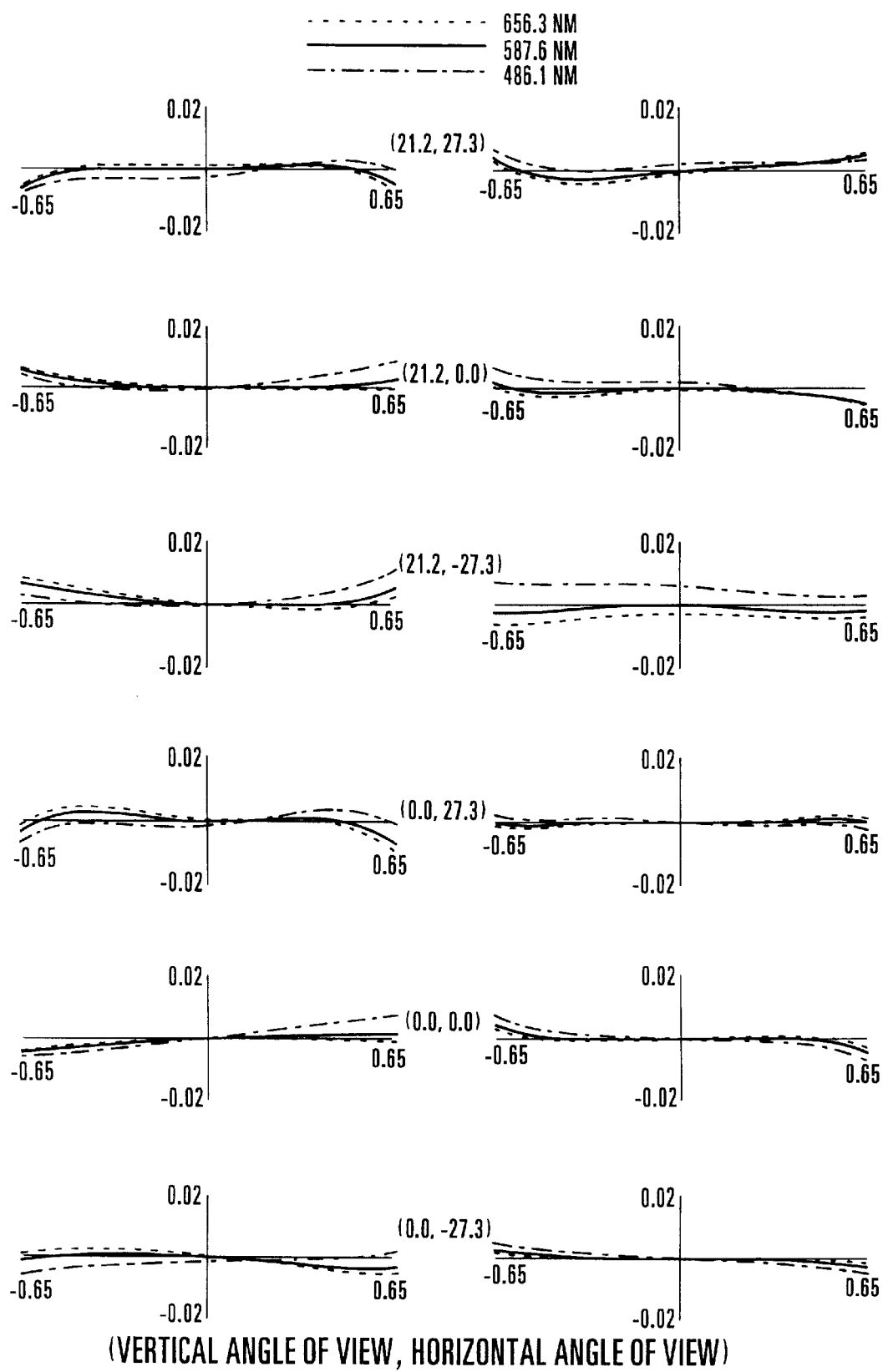
FIG. 18 is a lateral aberration chart of Numerical Example 2 relative to the wide-angle end.
Figure 19:
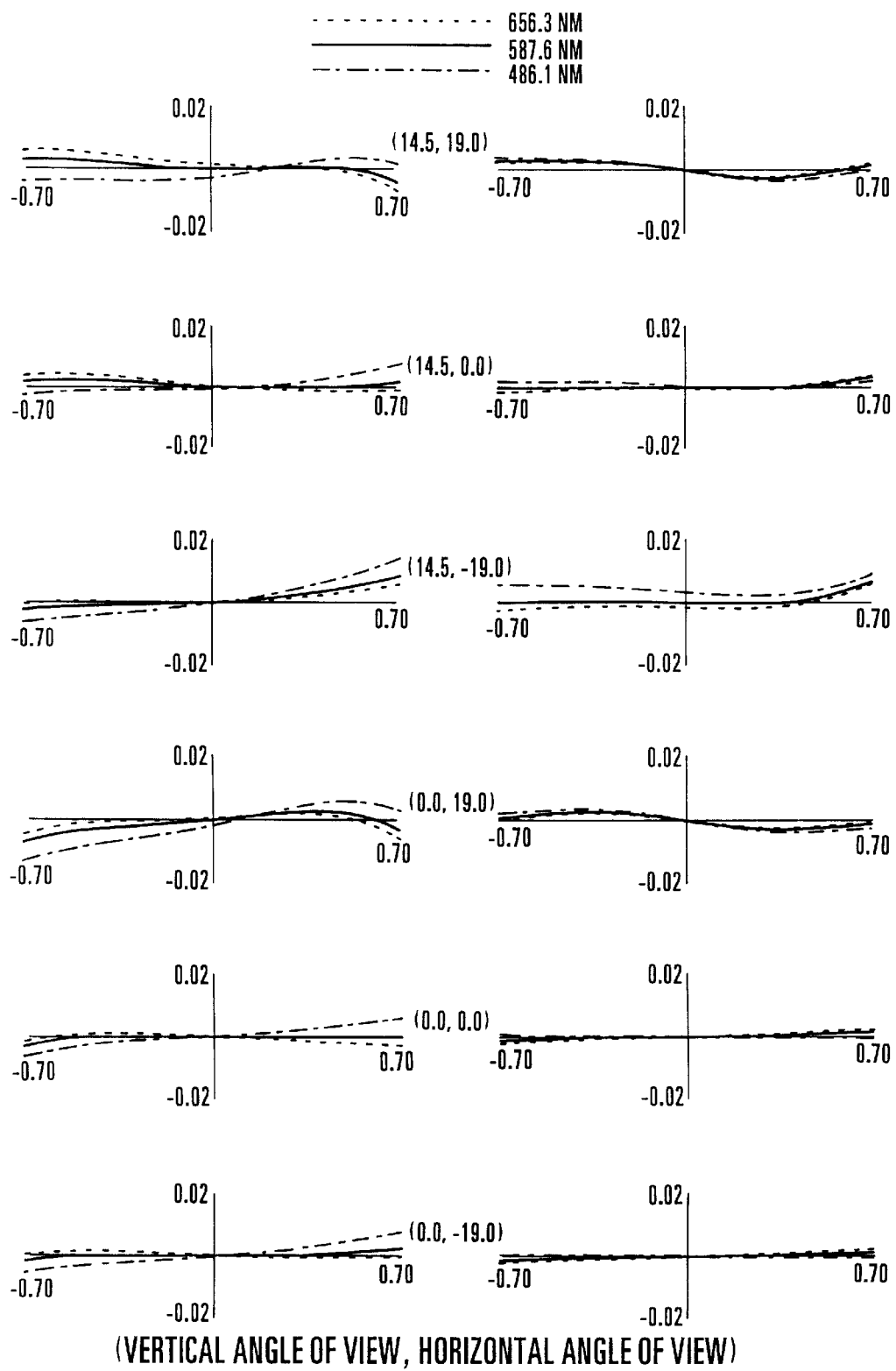
FIG. 19 is a lateral aberration chart of Numerical Example 2 relative to the middle position.
Figure 20:
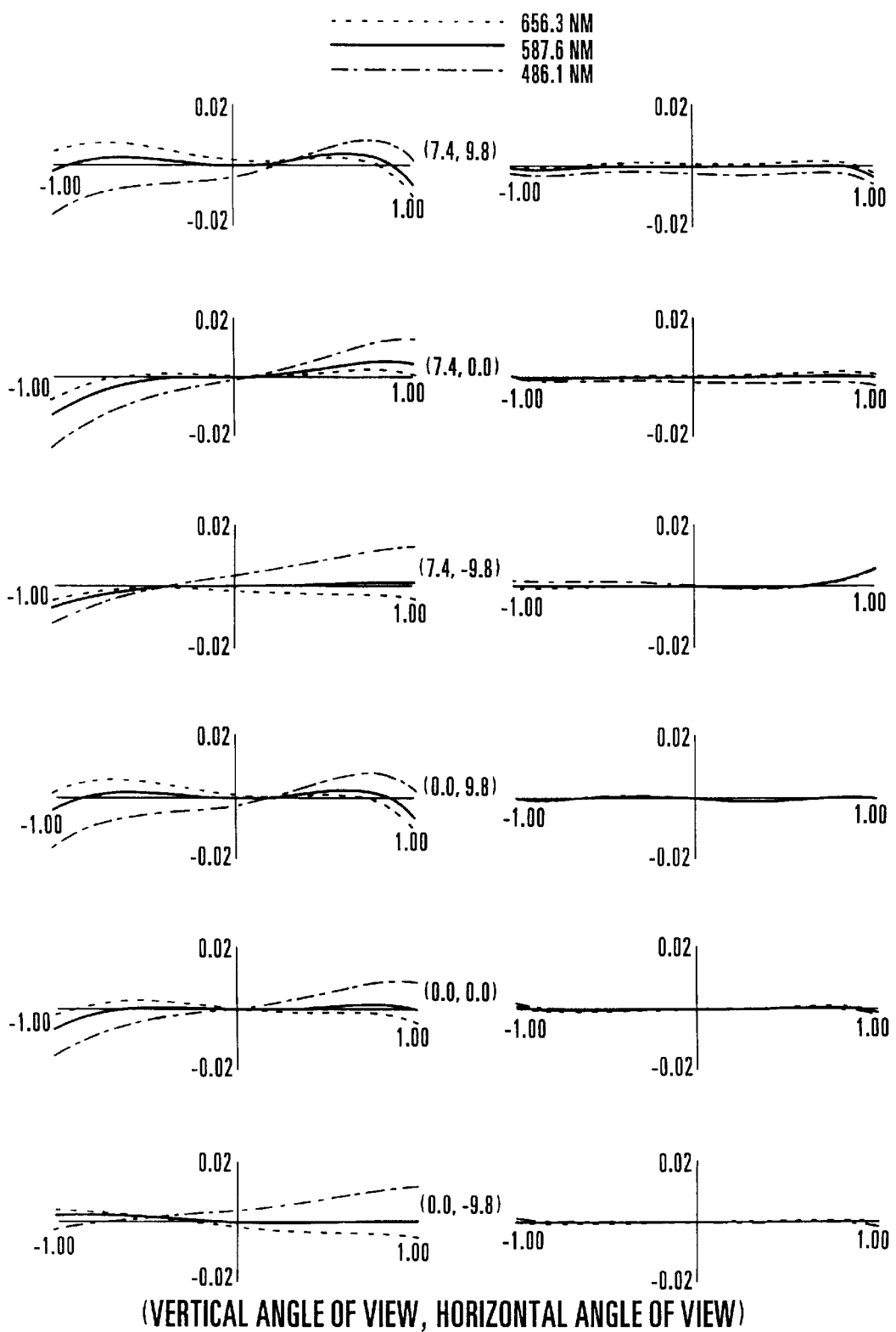
FIG. 20 is a lateral aberration chart of Numerical Example 2 relative to the telephoto end.

FIGS. 18, 19 and 20 show lateral aberration charts of Numerical Example 2 relative to the wide-angle end (W), the middle position (M) and the telephoto end (T), respectively. The respective lateral aberration charts show lateral aberrations in the Y and X directions, relative to six light beams which enter Numerical Example 2 at different angles of incidence of $(u_Y, u_X)$, $(0, u_X)$, $(-u_Y, u_X)$, $(u_Y, 0)$, $(0, 0)$ and $(-n_Y, 0)$, respectively. The horizontal axis of each of the lateral aberration charts represents the height of incidence in the Y or X direction of a light beam which is incident on each of the entrance pupils.

As can be seen from these figures, Numerical Example 2 is capable of achieving well-balanced correction of aberration at each focal-length position.

In addition, the optical system of Numerical Example 2 is approximately 6.6 mm thick for an image size of 3.76 mm×2.82 mm. In Numerical Example 2, because each of the optical units and the entire optical system has a small thickness and each of the optical units can be constructed by forming reflecting surfaces on predetermined sides of a plate-shaped transparent body, it is possible to readily construct a variable magnification optical system which is thin as a whole, by adopting a mechanism which causes two optical units to move along a surface of one base plate.

Incidentally, in Numerical Example 2, although a chromatic aberration is caused by a plurality of refracting surfaces, the curvature of each of the refracting surfaces is appropriately determined so that the chromatic aberration is corrected over the entire range of variation of magnification.

[Numerical Example 3]

Numerical Example 3 is a numerical example of the third embodiment and is a variable magnification optical system having a magnification variation ratio of approximately 3.0×. FIGS. 21, 22 and 23 are crosssectional views taken in the Y, Z plane, showing the respective optical paths of Numerical Example 3 relative to the wide-angle end (W), the middle position (M) and the telephoto end (T).

|   |   |   |   |   | WIDE-ANGLE END | MIDDLE POSITION | TELEPHOTO END |
|---|---|---|---|---|---|---|---|
| HORIZONTAL HALF-ANGLE OF VIEW |   |   |   |   | 27.3 | 14.6 | 9.8 |
| VERTICAL HALF-ANGLE OF VIEW |   |   |   |   | 21.2 | 11.1 | 7.4 |
| APERTURE DIAMETER |   |   |   |   | 1.30 | 1.40 | 2.00 |
| i | Yi | Zi(W) | θi | Di | Ndi | vdi |   |
| 1 | 0.00 | 0.00 | 0.00 | 1.00 | 1 |   | STOP |
| FIRST OPTICAL UNIT B1 |   |   |   |   |   |   |   |
| 2 | 0.00 | 1.00 | 0.00 | 6.00 | 1.49171 | 57.40 | RE-FRACTING SURFACE |
| 3 | 0.00 | 7.00 | 30.00 | 8.00 | 1.49171 | 57.40 | RE-FLECTING SURFACE |

-continued

| | | | | | | |
|---|---|---|---|---|---|---|
| 4 | −6.93 | 3.00 | 30.00 | 7.60 | 1.49171 | 57.40 RE-FLECTING SURFACE |
| 5 | −6.93 | 10.60 | 30.00 | 8.00 | 1.49171 | 57.40 RE-FLECTING SURFACE |
| 6 | −13.86 | 6.60 | 30.00 | 10.00 | 1.49171 | 57.40 RE-FLECTING SURFACE |
| 7 | −13.86 | 16.60 | 0.00 | VARIABLE | 1 | RE-FRACTING SURFACE |

SECOND OPTICAL UNIT B2

| | | | | | | |
|---|---|---|---|---|---|---|
| 8 | −13.86 | 20.39 | 0.00 | 6.00 | 1.49171 | 57.40 RE-FRACTING SURFACE |
| 9 | −13.86 | 26.39 | −30.00 | 8.00 | 1.49171 | 57.40 RE-FLECTING SURFACE |
| 10 | −6.93 | 22.39 | −30.00 | 7.60 | 1.49171 | 57.40 RE-FLECTING SURFACE |
| 11 | −6.93 | 29.99 | −30.00 | 8.00 | 1.49171 | 57.40 RE-FLECTING SURFACE |
| 12 | −0.00 | 25.99 | −30.00 | 6.00 | 1.49171 | 57.40 RE-FLECTING SURFACE |
| 13 | −0.00 | 31.99 | 0.00 | VARIABLE | 1 | RE-FRACTING SURFACE |

THIRD OPTICAL UNIT B3

| | | | | | | |
|---|---|---|---|---|---|---|
| 14 | 0.00 | 34.81 | 0.00 | 6.00 | 1.49171 | 57.40 RE-FRACTING SURFACE |
| 15 | 0.00 | 40.81 | 30.00 | 8.00 | 1.49171 | 57.40 RE-FLECTING SURFACE |
| 16 | −6.93 | 36.81 | 15.00 | 8.00 | 1.49171 | 57.40 RE-FLECTING SURFACE |
| 17 | −10.93 | 43.74 | 0.00 | 8.00 | 1.49171 | 57.40 RE-FLECTING SURFACE |
| 18 | −14.93 | 36.81 | −15.00 | 8.00 | 1.49171 | 57.40 RE-FLECTING SURFACE |
| 19 | −21.86 | 40.81 | −30.00 | 6.00 | 1.49171 | 57.40 RE-FLECTING SURFACE |
| 20 | −21.86 | 34.81 | 0.00 | VARIABLE | 1 | RE-FRACTING SURFACE |

FOURTH OPTICAL UNIT B4

| | | | | | | |
|---|---|---|---|---|---|---|
| 21 | −21.86 | 32.00 | 0.00 | 6.00 | 1.49171 | 57.40 RE-FRACTING SURFACE |
| 22 | −21.86 | 26.00 | −30.00 | 8.00 | 1.49171 | 57.40 RE-FLECTING SURFACE |
| 23 | −28.78 | 30.00 | −30.00 | 8.00 | 1.49171 | 57.40 RE-FLECTING SURFACE |
| 24 | −28.78 | 22.00 | −30.00 | 8.00 | 1.49171 | 57.40 RE-FLECTING SURFACE |
| 25 | −33.98 | 25.00 | −30.00 | VARIABLE | 1 | RE-FRACTING SURFACE |
| 26 | −37.94 | 27.29 | −60.00 | | 1 | IMAGE PLANE |

-continued

| | WIDE-ANGLE END | MIDDLE POSITION | TELEPHOTO END |
|---|---|---|---|
| D7 | 1.89 | 0.73 | 0.30 |
| D13 | 1.41 | 3.09 | 4.34 |
| D20 | 1.40 | 1.92 | 2.74 |
| D25 | 4.57 | 4.57 | 4.57 |
| R1–R7 | $Zi(M) = Zi(W)$ | | $Zi(T) = Zi(W)$ |
| R8–R13 | $Zi(M) = Zi(W) - 1.16$ | | $Zi(T) = Zi(W) - 1.59$ |
| R14–R20 | $Zi(M) = Zi(W) + 0.52$ | | $Zi(T) = Zi(W) + 1.34$ |
| R21–R25 | $Zi(M) = Zi(W)$ | | $Zi(T) = Zi(W)$ |
| R26 | $Zi(M) = Zi(W)$ | | $Zi(T) = Zi(W)$ |

SPHERICAL SHAPE

R2  $R_2 = 10.000$
R7  $R_7 = -11.861$
R8  $R_8 = -12.000$
R13  $R_{13} = 19.270$
R14  $R_{14} = -20.000$
R20  $R_{20} = -30.000$
R21  $R_{21} = 30.000$
R25  $R_{25} = \infty$

ASPHERICAL SHAPE

R3  $C_{02} = -2.18846e-02$  $C_{20} = -7.94168e-02$
  $C_{03} = 1.01978e-03$  $C_{21} = 3.29378e-04$
  $C_{04} = -4.69647e-05$  $C_{22} = -4.58448e-04$  $C_{40} = -1.24868e-03$
  $C_{05} = -9.09198e-07$  $C_{23} = -6.44182e-05$  $C_{41} = 1.11077e-04$
  $C_{06} = 4.04930e-06$  $C_{24} = 2.72587e-05$  $C_{42} = -4.20029e-07$
  $C_{60} = -3.03022e-05$

R4  $C_{02} = 3.22275e-02$  $C_{20} = 5.21955e-02$
  $C_{03} = -6.04655e-04$  $C_{21} = 4.46186e-03$
  $C_{04} = -1.15020e-04$  $C_{22} = 6.08476e-04$  $C_{40} = 2.64420e-04$
  $C_{05} = -1.06439e-05$  $C_{23} = -4.07617e-05$  $C_{41} = -3.25160e-05$
  $C_{06} = 6.18208e-06$  $C_{24} = 5.34438e-06$  $C_{42} = -4.37365e-05$
  $C_{60} = -9.37322e-06$

R5  $C_{02} = -3.88635e-02$  $C_{20} = -3.17773e-02$
  $C_{03} = -1.67046e-03$  $C_{21} = -2.75734e-03$
  $C_{04} = 3.74357e-04$  $C_{22} = 4.19763e-04$  $C_{40} = 2.73730e-04$
  $C_{05} = 4.44960e-05$  $C_{23} = -1.04108e-05$  $C_{41} = -2.86923e-05$
  $C_{06} = -9.68958e-06$  $C_{24} = 1.27122e-05$  $C_{42} = -1.60603e-05$
  $C_{60} = 5.57583e-07$

R6  $C_{02} = 4.35667e-02$  $C_{20} = 1.45464e-02$
  $C_{03} = 1.09777e-05$  $C_{21} = -6.12820e-04$
  $C_{04} = 1.92251e-05$  $C_{22} = 8.81604e-04$  $C_{40} = 2.79639e-04$
  $C_{05} = 1.28187e-05$  $C_{23} = 9.01770e-05$  $C_{41} = -3.20520e-05$
  $C_{06} = 1.31765e-06$  $C_{24} = -4.14701e-06$  $C_{42} = -3.51908e-05$
  $C_{60} = 4.49165e-06$

R9  $C_{02} = -2.96329e-02$  $C_{20} = -3.47880e-02$
  $C_{03} = -3.39586e-04$  $C_{21} = 7.15403e-05$
  $C_{04} = -3.99782e-05$  $C_{22} = -1.02018e-05$  $C_{40} = -2.38647e-05$
  $C_{05} = C_{23} = C_{41} = C_{06} = C_{24} = C_{42} = C_{60} = 0$

R10  $C_{02} = 9.38533e-03$  $C_{20} = 1.71831e-02$
  $C_{03} = -6.67242e-04$  $C_{21} = 4.56851e-03$
  $C_{04} = -6.95688e-05$  $C_{22} = 4.30907e-04$  $C_{40} = 4.28384e-04$
  $C_{05} = C_{23} = C_{41} = C_{06} = C_{24} = C_{42} = C_{60} = 0$

R11  $C_{02} = 1.71216e-02$  $C_{20} = -2.52622e-02$
  $C_{03} = -5.81409e-04$  $C_{21} = -7.76674e-03$
  $C_{04} = 2.37461e-04$  $C_{22} = 2.48421e-03$  $C_{40} = 1.78778e-03$
  $C_{05} = C_{23} = C_{41} = C_{06} = C_{24} = C_{42} = C_{60} = 0$

R12  $C_{02} = 3.06029e-02$  $C_{20} = 4.70754e-02$
  $C_{03} = -3.57102e-04$  $C_{21} = -7.07125e-04$
  $C_{04} = 4.10287e-05$  $C_{22} = 9.61167e-05$  $C_{40} = 1.10870e-04$
  $C_{05} = C_{23} = C_{41} = C_{06} = C_{24} = C_{42} = C_{60} = 0$

R15  $C_{02} = -1.05575e-02$  $C_{20} = -2.27289e-02$
  $C_{03} = 4.86561e-04$  $C_{21} = -2.47862e-03$
  $C_{04} = -1.88144e-05$  $C_{22} = -1.52285e-04$  $C_{40} = 9.47294e-05$
  $C_{05} = C_{23} = C_{41} = C_{06} = C_{24} = C_{42} = C_{60} = 0$

R16  $C_{02} = 1.45977e-03$  $C_{20} = -1.00930e-02$
  $C_{03} = 9.03605e-04$  $C_{21} = -6.89431e-03$
  $C_{04} = -2.88191e-05$  $C_{22} = -5.04296e-04$  $C_{40} = -3.69386e-04$
  $C_{05} = C_{23} = C_{41} = C_{06} = C_{24} = C_{42} = C_{60} = 0$

R17  $C_{02} = -2.74679e-02$  $C_{20} = -2.92386e-02$
  $C_{03} = 6.81014e-04$  $C_{21} = -9.36996e-04$
  $C_{04} = 6.06884e-05$  $C_{22} = -2.30147e-04$  $C_{40} = -5.11197e-05$
  $C_{05} = C_{23} = C_{41} = C_{06} = C_{24} = C_{42} = C_{60} = 0$

-continued

| | | | |
|---|---|---|---|
| R18 | $C_{02} = -1.34864e-02$ | $C_{20} = -3.24542e-02$ | |
| | $C_{03} = 1.07936e-03$ | $C_{21} = -7.89441e-03$ | |
| | $C_{04} = -2.01719e-04$ | $C_{22} = 8.22386e-05$ | $C_{40} = -4.44303e-04$ |
| | $C_{05} = C_{23} = C_{41} = C_{06} = C_{24} = C_{42} = C_{60} = 0$ | | |
| R19 | $C_{02} = -2.46824e-02$ | $C_{20} = -3.03638e-02$ | |
| | $C_{03} = -3.76515e-04$ | $C_{21} = -2.92059e-04$ | |
| | $C_{04} = -2.79991e-05$ | $C_{22} = -9.57774e-06$ | $C_{40} = -1.28312e-05$ |
| | $C_{05} = C_{23} = C_{41} = C_{06} = C_{24} = C_{42} = C_{60} = 0$ | | |
| R22 | $C_{02} = 3.10568e-02$ | $C_{20} = 4.46377e-02$ | |
| | $C_{03} = 3.55258e-04$ | $C_{21} = -4.06985e-03$ | |
| | $C_{04} = -3.60232e-06$ | $C_{22} = 4.79342e-04$ | $C_{40} = 2.91431e-04$ |
| | $C_{05} = -5.89183e-06$ | $C_{23} = -7.97724e-06$ | $C_{41} = -2.15362e-05$ |
| | $C_{06} = 2.47486e-06$ | $C_{24} = -5.25575e-06$ | $C_{42} = -7.89891e-06$ |
| | $C_{60} = 1.03848e-05$ | | |
| R23 | $C_{02} = 1.77062e-04$ | $C_{20} = -1.45813e-03$ | |
| | $C_{03} = -2.06697e-03$ | $C_{21} = 1.20078e-02$ | |
| | $C_{04} = -5.30920e-04$ | $C_{22} = 6.81356e-04$ | $C_{40} = -1.17152e-03$ |
| | $C_{05} = 1.95637e-04$ | $C_{23} = 5.04104e-04$ | $C_{41} = -7.36881e-04$ |
| | $C_{06} = 1.50523e-04$ | $C_{24} = 6.78737e-04$ | $C_{42} = 1.17298e-04$ |
| | $C_{60} = 1.11840e-04$ | | |
| R24 | $C_{02} = 3.18419e-02$ | $C_{20} = 4.07594e-02$ | |
| | $C_{03} = 8.92227e-04$ | $C_{21} = 5.68836e-04$ | |
| | $C_{04} = 1.04165e-04$ | $C_{22} = 6.29017e-05$ | $C_{40} = 4.40747e-05$ |
| | $C_{05} = 8.50762e-06$ | $C_{23} = -1.43990e-06$ | $C_{41} = 1.83610e-05$ |
| | $C_{06} = 1.05981e-06$ | $C_{24} = 2.19115e-06$ | $C_{42} = 1.26129e-07$ |
| | $C_{60} = -1.08684e-06$ | | |

The construction of Numerical Example 3 will be described in order from the object side. The first surface R1 is an aperture plane. The first optical unit B1 is formed as one transparent body on which are formed the second surface R2 (entrance refracting surface), the third to sixth surfaces R3 to R6 each of which is a decentered curved internal reflecting surface, and the seventh surface R7 (exit refracting surface). The second optical unit B2 is formed as one transparent body on which are formed the eighth surface R8 (entrance refracting surface), the ninth to twelfth surfaces R9 to R12 each of which is a decentered curved internal reflecting surface, and the thirteenth surface R13 (exit refracting surface). The third optical unit B3 is formed as one transparent body on which are formed the fourteenth surface R14 (entrance refracting surface), the fifteenth to nineteenth surfaces R15 to R19 each of which is a decentered curved internal reflecting surface, and the twentieth surface R20 (exit refracting surface). The fourth optical unit B4 is formed as one transparent body on which are formed the twenty-first surface R21 (entrance refracting surface), the twenty-second to twenty-fourth surfaces R22 to R24 each of which is a decentered curved internal reflecting surface, and the twenty-fifth surface R25 (exit refracting surface). The twenty-sixth surface R26 is a final image plane in which the image pickup surface of an image pickup device such as a CCD is positioned.

The optical units of Numerical Example 3 are four separate optical units which constitute a variable magnification optical system. The second and third optical units B2 and B3 are magnification varying optical units which respectively move to perform a magnification varying operation.

An image forming operation for an object lying at infinity will be described below. First, a light beam which has passed through the stop R1 enters the first optical unit B1. In the first optical unit B1, the light beam is refracted by the second surface R2, then reflected from surface to surface by the third surface R3 to the sixth surface R6, then refracted by the seventh surface R7, and then exits from the first optical unit B1. During this time, a first-order image is formed in the vicinity of the fourth surface R4, and a second-order image is formed between the sixth surface R6 and the seventh surface R7. A pupil is formed in the vicinity of the fifth surface R5.

Then, the light beam enters the second optical unit B2. In the second optical unit B2, the light beam is refracted by the eighth surface R8, then reflected from surface to surface by the ninth surface R9 to the twelfth surface R12, then refracted by the thirteenth surface R13, and then exits from the second optical unit B2. During this time, a third-order image forming plane is formed between the tenth surface R10 and the eleventh surface R11 when the focal length is at the wide-angle end, or in the vicinity of the eleventh surface R11 when the focal length is at the telephoto end.

Then, the light beam enters the third optical unit B3. In the third optical unit B3, the light beam is refracted by the fourteenth surface R14, then reflected from surface to surface by the fifteenth surface R15 to the nineteenth surface R19, then refracted by the twentieth surface R20, and then exits from the third optical unit B3. During this time, a fourth-order image forming plane is formed in the vicinity of the sixteenth surface R16 when the focal length is at the wide-angle end, or between the sixteenth surface R16 and the seventeenth surface R17 when the focal length is at the telephoto end. A pupil is formed in the vicinity of the eighteenth surface R18.

Then, the light beam enters the fourth optical unit B4. In the fourth optical unit B4, the light beam is refracted by the twenty-first surface R21, then reflected from surface to surface by the twenty-second surface R22 to the twenty-fourth surface R24, then refracted by the twenty-fifth surface R25, and then exits from the fourth optical unit B4. During this time, a fifth-order forming plane is formed in the vicinity of the twenty-second surface R22. A pupil is formed in the vicinity of the twenty-third surface R23.

Then, the light beam which has exited from the fourth optical unit B4 finally forms a sixth-order image on the twenty-sixth surface R26.

In Numerical Example 3, each of the first optical unit B1 and the second optical unit B2 is an off-axial optical unit whose entering reference axis and exiting reference axis are the same as each other in direction. The third optical unit B3 is an off-axial optical unit whose entering reference axis and exiting reference axis differ from each other by 180° in direction. The fourth optical unit B4 is an off-axial optical unit whose entering reference axis and exiting reference axis differ from each other by approximately 120° in direction.

The magnification varying operation based on the movement of the optical units will be described below. During the magnification varying operation, the stop R1, the first optical unit B1, the fourth optical unit B4 and the image plane R26 are fixed. As the focal length varies from the wide-angle end toward the telephoto end, the second optical unit B2 moves in the Z minus direction, while the third optical unit B3 moves in the Z plus direction. Thus, during the magnification varying operation from the wide-angle end toward the telephoto end, the distance between the first optical unit B1 and the second optical unit B2 is decreased, the distance between the second optical unit B2 and the third optical unit B3 is increased, and the distance between the third optical unit B3 and the fourth optical unit B4 is increased. In addition, as the focal length varies from the wide-angle end toward the telephoto end, the entire optical path length which extends from the first surface R1 to the twenty-sixth plane R26 becomes longer.

Figure 24:
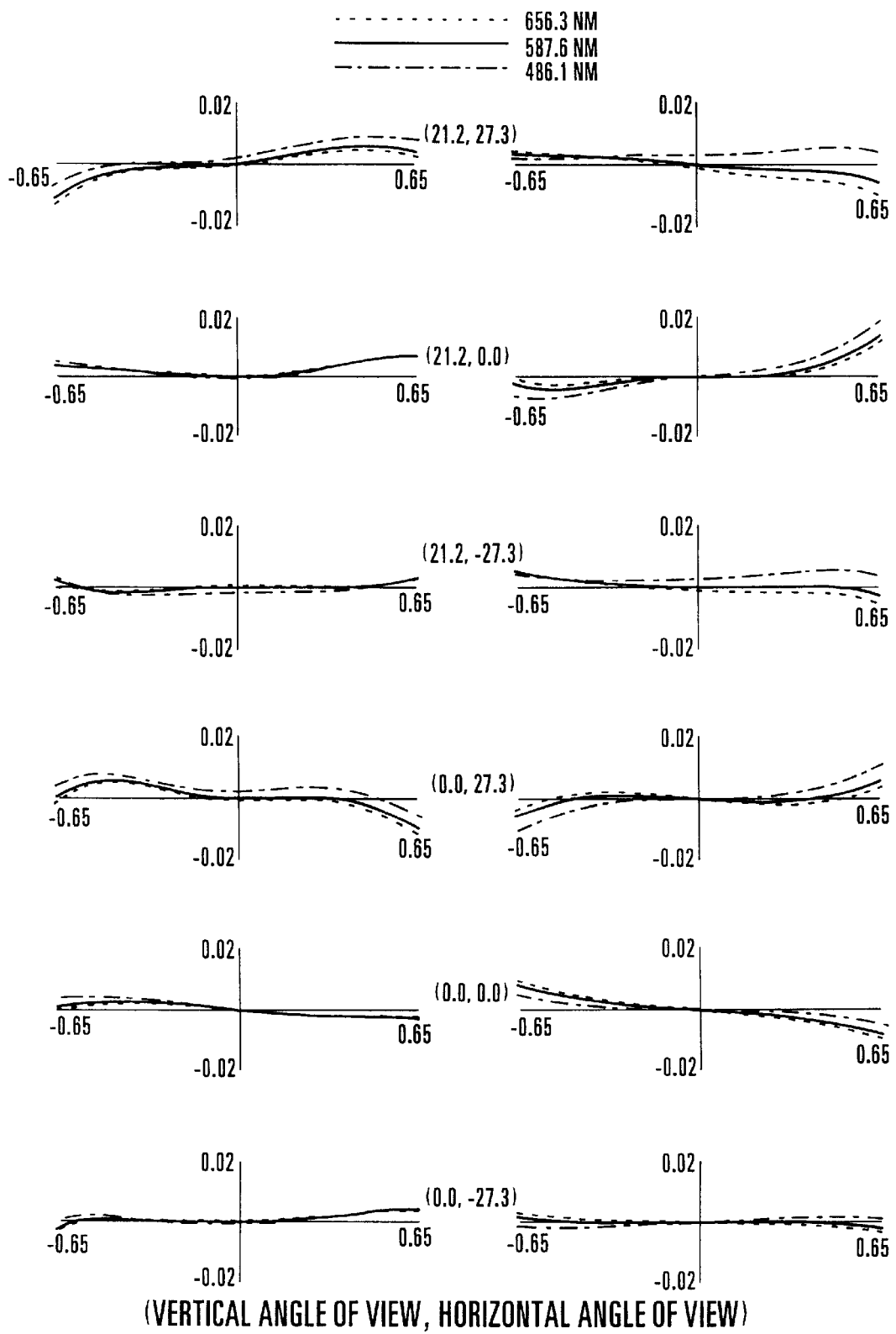
FIG. 24 is a lateral aberration chart of Numerical Example 3 relative to the wide-angle end.
Figure 25:
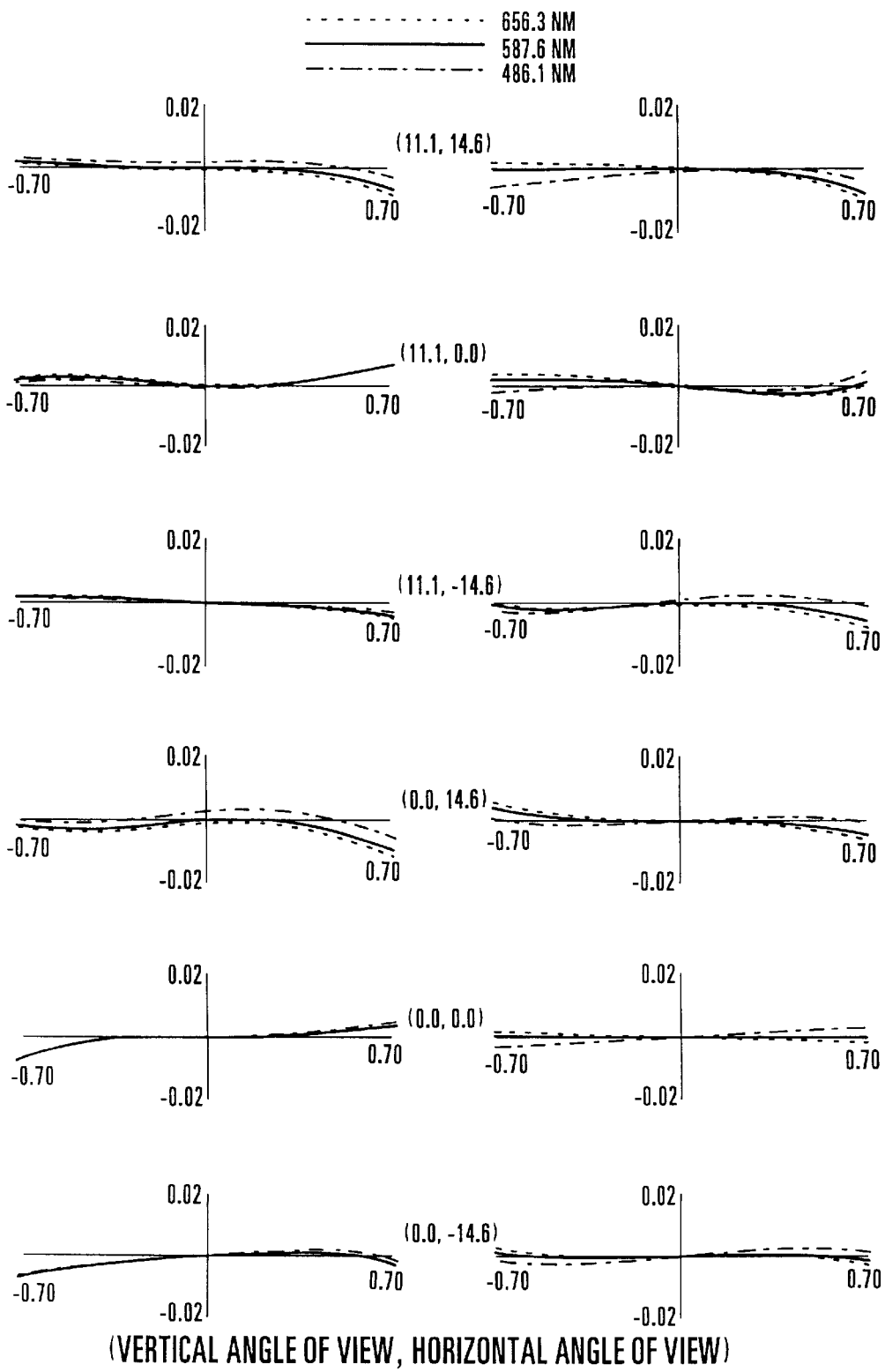
FIG. 25 is a lateral aberration chart of Numerical Example 3 relative to the middle position.
Figure 26:
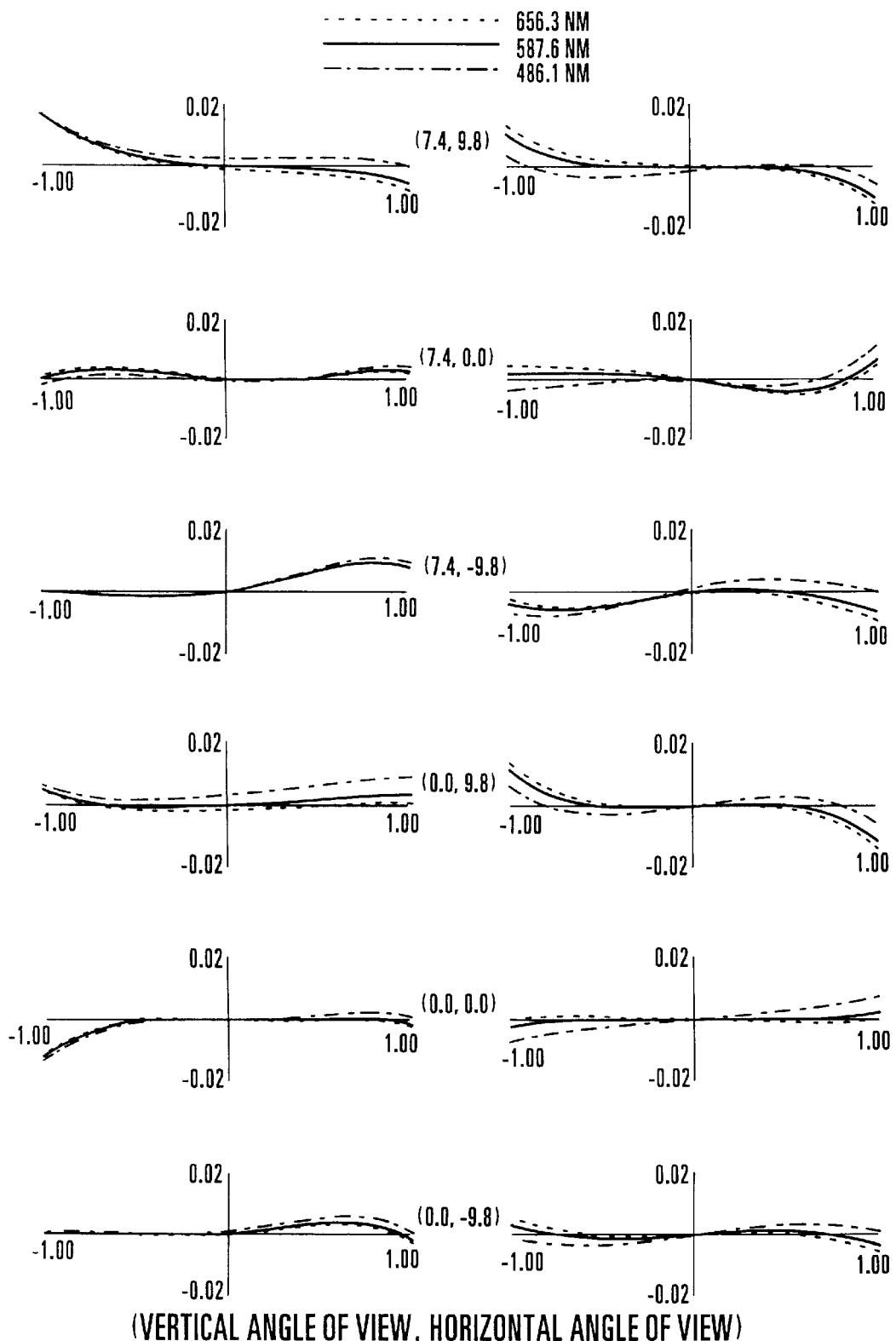
FIG. 26 is a lateral aberration chart of Numerical Example 3 relative to the telephoto end.
Figure 27:
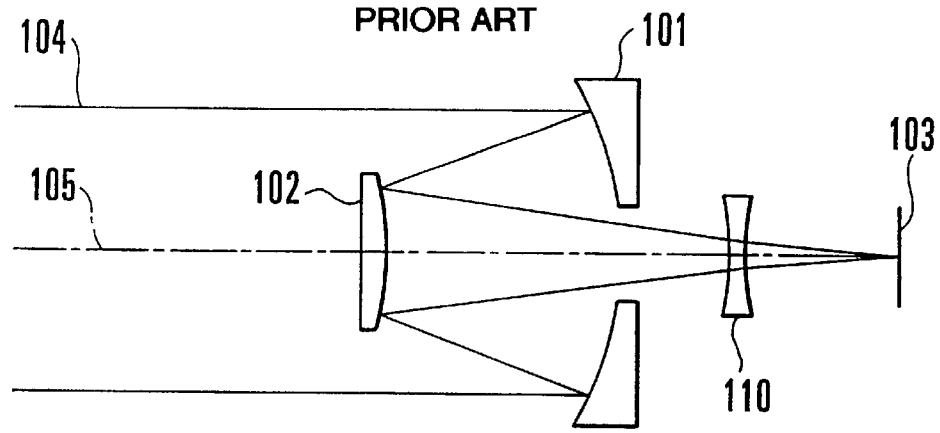
FIG. 27 is a view of the basic arrangement of a Cassegrainian reflecting telescope.
Figure 28:
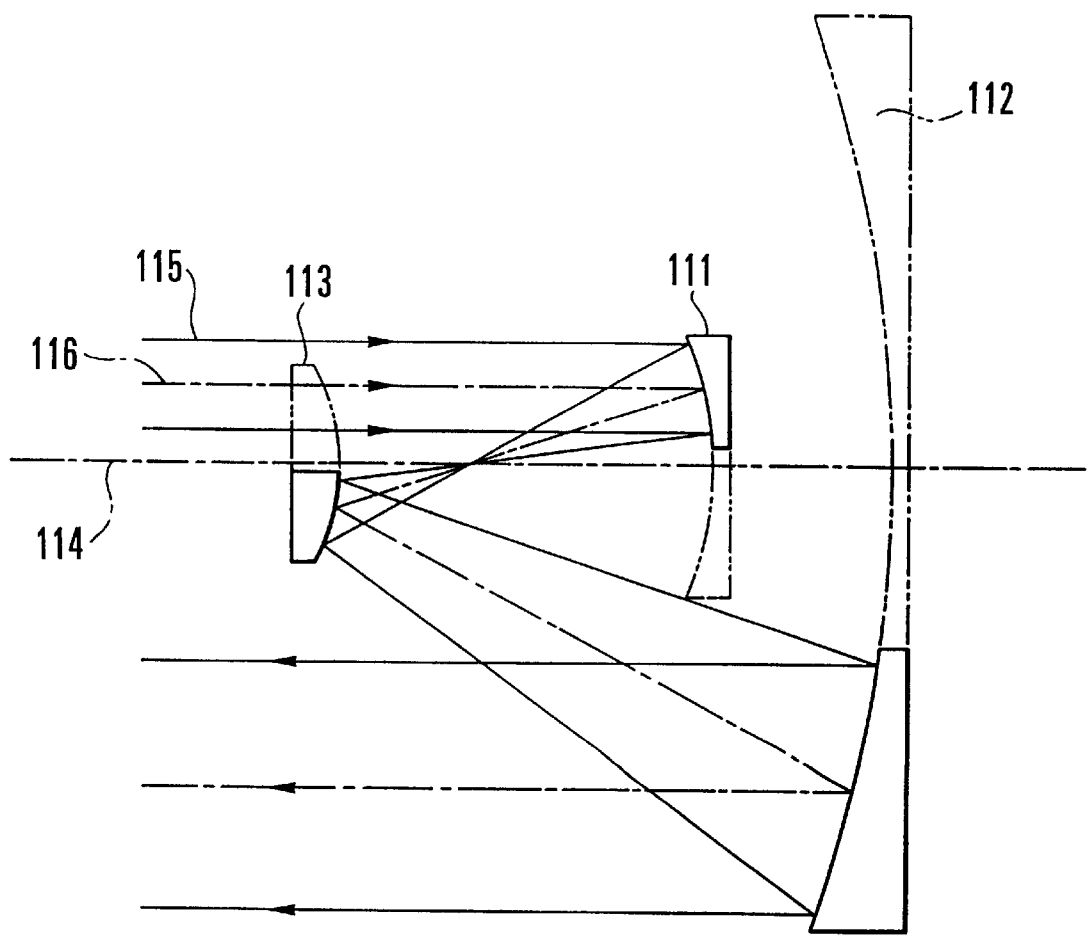
FIG. 28 is an explanatory view showing a first method of preventing shading by shifting a principal ray from the optical axis of a mirror optical system.
Figure 29:
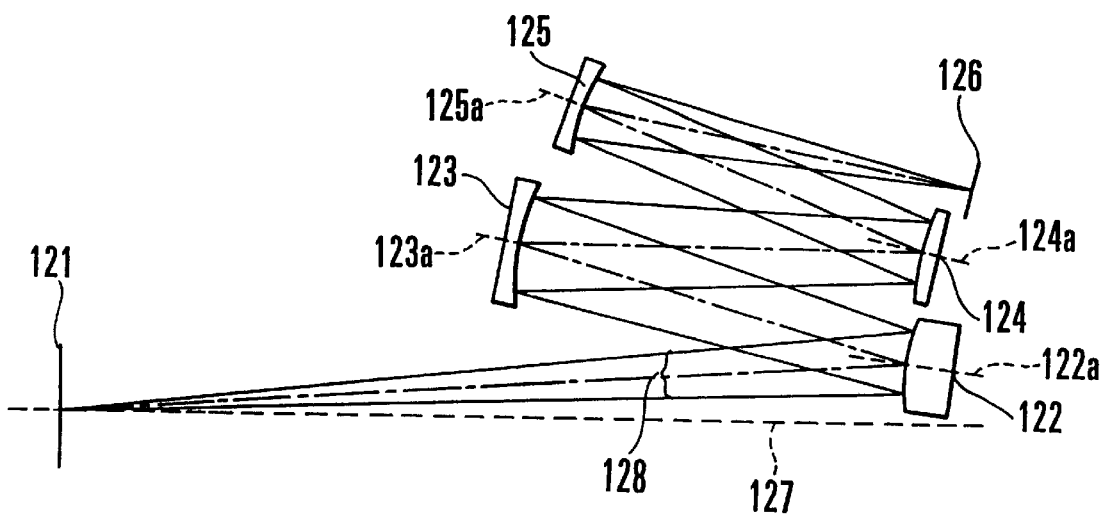
FIG. 29 is an explanatory view showing a second method of preventing shading by shifting a principal ray from the optical axis of a mirror optical system.
Figure 30:
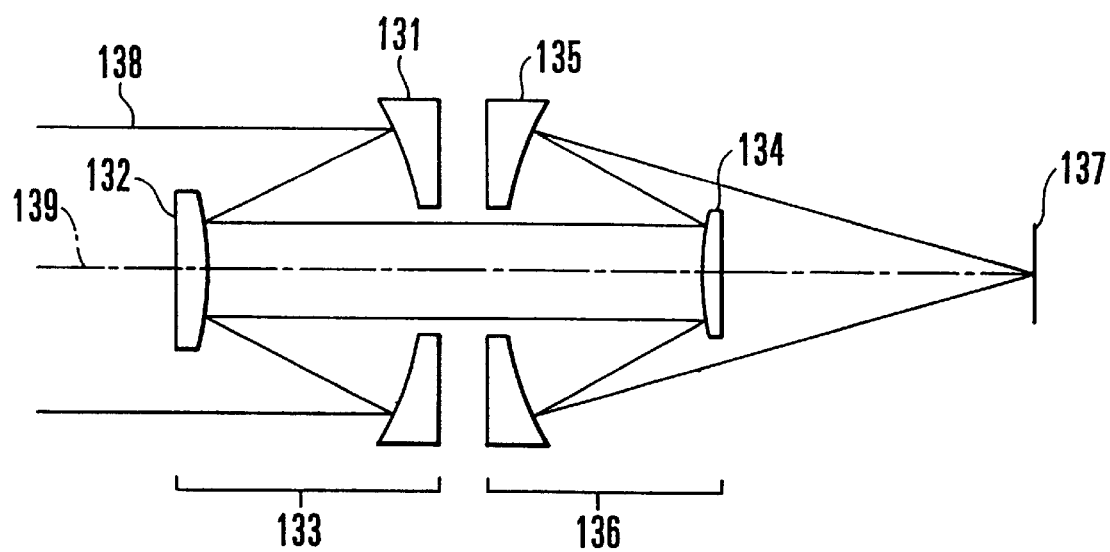
FIG. 30 is a conceptual diagram of a zoom optical system employing conventional reflecting mirrors.
Figure 31:
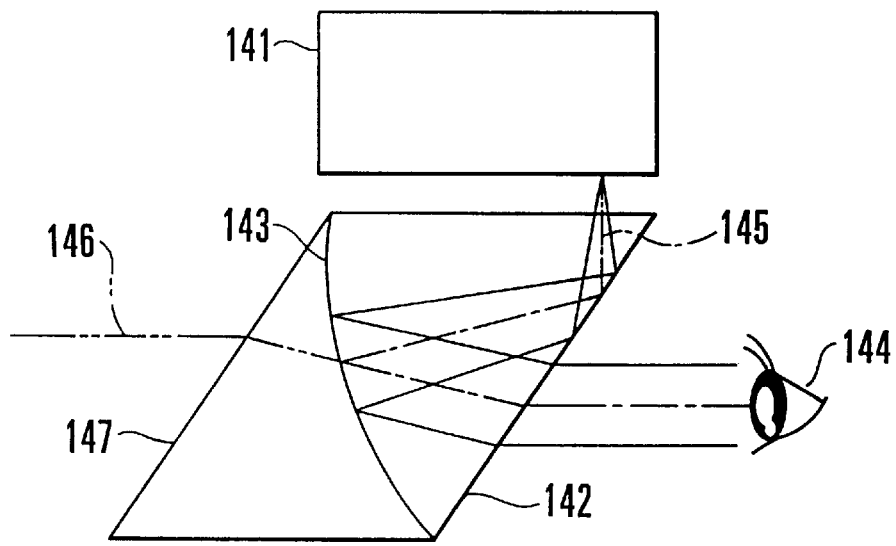
FIG. 31 is a conceptual diagram of an observing optical system whose prism has a reflecting surface having a curvature.
Figure 32:
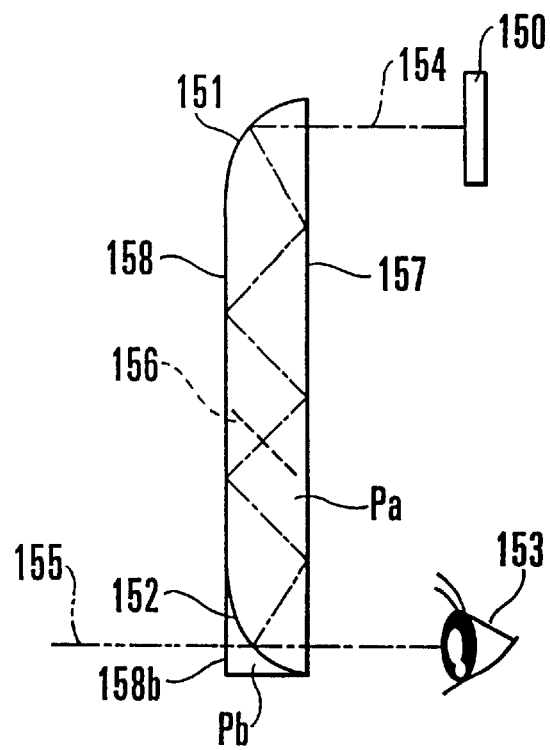
FIG. 32 is a conceptual diagram of another observing optical system whose prism has a reflecting surface having a curvature.

FIGS. 24, 25 and 26 show lateral aberration charts of Numerical Example 3 relative to the wide-angle end (W), the middle position (M) and the telephoto end (T), respectively. The respective lateral aberration charts show lateral aberrations in the Y and X directions, relative to six light beams which enter Numerical Example 3 at different angles of incidence of $(u_Y, u_X)$, $(0, u_X)$, $(-u_Y, u_Y)$, $(u_Y, 0)$, $(0, 0)$ and $(-u_Y, 0)$, respectively. The horizontal axis of each of the lateral aberration charts represents the height of incidence in the Y or X direction of a light beam which is incident on each of the entrance pupils.

As can be seen from these figures, Numerical Example 3 is capable of achieving well-balanced correction of aberration at each focal-length position.

In addition, the optical system of Numerical Example 3 is approximately 7.7 mm thick for an image size of 3.76 mm×2.82 mm. In Numerical Example 3, because each of the optical units and the entire optical system has a small thickness and each of the optical units can be constructed by forming reflecting surfaces on predetermined sides of a plate-shaped transparent body, it is possible to readily construct a variable magnification optical system which is thin as a whole, by adopting a mechanism which causes two optical units to move along a surface of one base plate.

Incidentally, in Numerical Example 3, although a chromatic aberration is caused by a plurality of refracting surfaces, the curvature of each of the refracting surfaces is appropriately determined so that the chromatic aberration is corrected over the entire range of variation of magnification.

Each of the above-described numerical examples according to the present invention is a variable magnification optical system which includes two movable optical units, but in which three optical units are movable in terms of optical arrangement and the entire optical path length from a stop to a final image forming plane varies during a magnification varying operation. Accordingly, any of the above-described numerical examples makes it possible to enhance the degree of freedom of aberration correction and to readily achieve a high-performance variable magnification optical system.

In addition, since any of the above-described numerical examples has a fixed off-axial optical unit as the fourth optical unit, aberration correction becomes far easier, and it is possible, in terms of design, to flexibly cope with various layouts of an image pickup medium and an image-pickup-light-beam introducing aperture to be disposed for an image pickup apparatus.

In accordance with the above-described arrangement and construction, the present invention achieves a high-performance variable magnification optical system which includes four off-axial optical units two of which relatively move to vary the magnification of the variable magnification optical system, the variable magnification optical system being capable of varying the magnification while varying the optical path length from an object to a final image plane with the final image forming plane spatially fixed, so that the thickness of the variable magnification optical system is small in spite of its wide angle of view and its entire length is short in a predetermined direction as well as its decentering aberration is fully corrected over the entire range of variation of magnification. The present invention further achieves an image pickup apparatus using such high-performance variable magnification optical system.

Moreover, the present invention achieves a variable magnification optical system having at least one of the following effects and advantages, and an image pickup apparatus employing such a variable magnification optical system.

Since a stop is arranged on the object side of the variable magnification optical system or in the vicinity of the first surface and an object image is formed by a plurality of times in the variable magnification optical system, the effective diameter and the thickness of the variable magnification optical system can be made small in spite of its wide angle of view.

Since each optical unit employs an optical unit having a plurality of reflecting surfaces having appropriate refractive powers and the reflecting surfaces are arranged in a decentered manner, the optical path in the variable magnification optical system can be bent into a desired shape to reduce the entire length of the variable magnification optical system in a predetermined direction.

A plurality of optical units which constitute the variable magnification optical system are each formed as a transparent body on which two refracting surfaces and a plurality of reflecting surfaces are integrally formed in such a manner that each of the reflecting surfaces is arranged in a decentered manner and is given an appropriate refractive power. Accordingly, the decentering aberration of the variable magnification optical system can be fully corrected over the entire range of variation of magnification.

Since each magnification varying optical unit is an optical unit which is formed as a transparent body on which two refracting surfaces and a plurality of curved or plane reflecting surfaces are integrally formed, not only is it possible to reduce the entire size of the variable magnification optical system, but it is also possible to solve the problem of excessively strict arrangement accuracy (assembly accuracy) which would have often been experienced with reflecting surfaces.

Since the fourth optical unit is a fixed off-axial optical unit, aberration correction becomes far easier, and it is possible, in terms of design, to flexibly cope with various layouts of an image pickup medium and an imagepickup-light-beam introducing aperture to be disposed for an image pickup apparatus.

What is claimed is:

1. A variable magnification optical system comprising four optical units each having a plurality of reflecting surfaces inclined with respect to a reference axis which is a ray passing from an aperture center of an aperture stop to a center of a final image plane, said variable magnification optical system being arranged to perform a magnification varying operation by moving at least two of said four optical units along the reference axis.

2. A variable magnification optical system according to claim 1, wherein an optical path length which extends along the reference axis from a predetermined position on an object side to the final image plane varies during the magnification varying operation.

3. A variable magnification optical system according to claim 1, wherein a reference axis ray which enters said optical units is represented as an entering reference axis of said optical units; a reference axis ray which exits from said optical units is represented as an exiting reference axis of said optical units; an intersection of the entering reference axis and each surface of said optical units is represented as a reference point; a direction in which the reference axis ray travels from an object side toward an image plane along the entering reference axis is represented as a direction of the entering reference axis; a direction in which the reference axis ray travels from the object side toward the image plane along the exiting reference axis is represented as a direction of the exiting reference axis; and said four optical units are respectively called first, second, third and fourth optical units in that order from the object side along the reference axis ray, the direction of the entering reference axis and the direction of the exiting reference axis of said first optical unit are the same as each other, and the direction of the entering reference axis and the direction of the exiting reference axis of each of said second and third optical units differ from each other by 180°, said first and third optical units moving to perform the magnification varying operation.

4. A variable magnification optical system according to claim 3, wherein each of said four optical units is an optical element formed as a transparent body on which two refracting surfaces and said plurality of reflecting surfaces are formed.

5. A variable magnification optical system according to claim 3, wherein said aperture stop is positioned on an object side of said first optical unit.

6. A variable magnification optical system according to claim 1, wherein a reference axis ray which enters said optical units is represented as an entering reference axis of said optical units; a reference axis ray which exits from said optical units is represented as an exiting reference axis of said optical units; an intersection of the entering reference axis and each surface of said optical units is represented as a reference point; a direction in which the reference axis ray travels from an object side toward an image plane along the entering reference axis is represented as a direction of the entering reference axis; a direction in which the reference axis ray travels from the object side toward the image plane along the exiting reference axis is represented as a direction of the exiting reference axis; and said four optical units are respectively called first, second, third and fourth optical units in that order from the object side along the reference axis ray, the direction of the entering reference axis and the direction of the exiting reference axis of each of said first and second optical units are the same as each other, and the direction of the entering reference axis and the direction of the exiting reference axis of said third optical unit differ from each other by 180°, said first and third optical units moving to perform the magnification varying operation.

7. A variable magnification optical system according to claim 6, wherein each of said four optical units is an optical element formed as a transparent body on which two refracting surfaces and said plurality of reflecting surfaces are formed.

8. A variable magnification optical system according to claim 6, wherein said aperture stop is positioned on an object side of said first optical unit.

9. A variable magnification optical system according to claim 1, wherein a reference axis ray which enters said optical units is represented as an entering reference axis of said optical units; a reference axis ray which exits from said optical units is represented as an exiting reference axis of said optical units; an intersection of the entering reference axis and each surface of said optical units is represented as a reference point; a direction in which the reference axis ray travels from an object side toward an image plane along the entering reference axis is represented as a direction of the entering reference axis; a direction in which the reference axis ray travels from the object side toward the image plane along the exiting reference axis is represented as a direction of the exiting reference axis; and said four optical units are respectively called first, second, third and fourth optical units in that order from the object side along the reference axis ray, the direction of the entering reference axis and the direction of the exiting reference axis of each of said first and second optical units are the same as each other, and the direction of the entering reference axis and the direction of the exiting reference axis of said third optical unit differ from each other by 180°, said second and third optical units moving to perform the magnification varying operation.

10. A variable magnification optical system according to claim 9, wherein each of said four optical units is an optical element formed as a transparent body on which two refracting surfaces and said plurality of reflecting surfaces are formed.

11. A variable magnification optical system according to claim 9, wherein said aperture stop is positioned on an object side of said first optical unit.

12. An image pickup apparatus comprising said variable magnification optical system according to claim 1, said image pickup apparatus being arranged to form an image of an object on an image pickup surface of an image pickup medium.

13. A variable magnification optical system according to claim 1, wherein each of said four optical units is an optical system comprising a transparent member through which light propagates, and a reflecting surface of said plurality of reflecting surfaces is provided on a surface of said transparent member to reflect the light.

14. A variable magnification optical system according to claim 13, wherein an optical path length which extends along the reference axis from a predetermined position on an object side to the final image plane varies during the magnification varying operation.

15. A variable magnification optical system according to claim 13, wherein a reference axis ray which enters said optical units is represented as an entering reference axis of said optical units; a reference axis ray which exits from said optical units is represented as an exiting reference axis of said optical units; an intersection of the entering reference axis and each surface of said optical units is represented as a reference point; a direction in which the reference axis ray travels from an object side toward an image plane along the entering reference axis is represented as a direction of the entering reference axis; a direction in which the reference axis ray travels from the object side toward the image plane along the exiting reference axis is represented as a direction of the exiting reference axis; and said four optical units are respectively called first, second, third and fourth optical units in that order from the object side along the reference axis ray, the direction of the entering reference axis and the direction of the exiting reference axis of said first optical unit are the same as each other, and the direction of the entering reference axis and the direction of the exiting reference axis of each of said second and third optical units differ from each other by 180°, said first and third optical units moving to perform the magnification varying operation.

16. A variable magnification optical system according to claim 15, wherein, on said transparent member of each of said four optical units, two refracting surfaces and said plurality of reflecting surfaces are formed.

17. A variable magnification optical system according to claim 15, wherein said aperture stop is positioned on an object side of said first optical unit.

18. A variable magnification optical system according to claim 13, wherein a reference axis ray which enters said optical units is represented as an entering reference axis of said optical units; a reference axis ray which exits from said optical units is represented as an exiting reference axis of said optical units; an intersection of the entering reference axis and each surface of said optical units is represented as a reference point; a direction in which the reference axis ray travels from an object side toward an image plane along the entering reference axis is represented as a direction of the entering reference axis; a direction in which the reference axis ray travels from the object side toward the image plane along the exiting reference axis is represented as a direction of the exiting reference axis; and said four optical units are respectively called first, second, third and fourth optical units in that order from the object side along the reference axis ray, the direction of the entering reference axis and the direction of the exiting reference axis of each of said first and second optical units are the same as each other, and the direction of the entering reference axis and the direction of the exiting reference axis of said third optical unit differ from each other by 180°, said first and third optical units moving to perform the magnification varying operation.

19. A variable magnification optical system according to claim 18, wherein, on said transparent member of each of said four optical units, two refracting surfaces and said plurality of reflecting surfaces are formed.

20. A variable magnification optical system according to claim 18, wherein said aperture stop is positioned on an object side of said first optical unit.

21. A variable magnification optical system according to claim 13, wherein a reference axis ray which enters said optical units is represented as an entering reference axis of said optical units; a reference axis ray which exits from said optical units is represented as an exiting reference axis of said optical units; an intersection of the entering reference axis and each surface of said optical units is represented as a reference point; a direction in which the reference axis ray travels from an object side toward an image plane along the entering reference axis is represented as a direction of the entering reference axis; a direction in which the reference axis ray travels from the object side toward the image plane along the exiting reference axis is represented as a direction of the exiting reference axis; and said four optical units are respectively called first, second, third and fourth optical units in that order from the object side along the reference axis ray, the direction of the entering reference axis and the direction of the exiting reference axis of each of said first and second optical units are the same as each other, and the direction of the entering reference axis and the direction of the exiting reference axis of said third optical unit differ from each other by 180°, said second and third optical units moving to perform the magnification varying operation.

22. A variable magnification optical system according to claim 21, wherein, on said transparent member of each of said four optical units, two refracting surfaces and said plurality of reflecting surfaces are formed.

23. A variable magnification optical system according to claim 21, wherein said aperture stop is positioned on an object side of said first optical unit.

24. An image pickup apparatus comprising said variable magnification optical system according to claim 13, said image pickup apparatus being arranged to form an image of an object on an image pickup surface of an image pickup medium.

\* \* \* \* \*

UNITED STATES PATENT AND TRADEMARK OFFICE
CERTIFICATE OF CORRECTION

PATENT NO.   : 6,163,400
DATED        : December 19, 2000
INVENTOR(S)  : Nanba

It is certified that error appears in the above-identified patent and that said Letters Patent is hereby corrected as shown below:

Column 2,
Line 21, "optical/closed" should read -- optical system disclosed --.
Line 22, "shown/cal" should read -- shown mirror optical --.
Line 23, "by/ering" should read -- by decentering --.
Line 24, "doptical" should read -- optical --.

Column 5,
Lines 28 and 29, should be in the same paragraph.

Column 15,
Line 1, "z" should read -- z --.

Column 16,
Line 58, "ux" should read -- $u_x$ --.

Column 17,
Line 27, "end" should read -- end (T). --.

Column 26,
Line 24, "position ." should read -- position --.

Column 31,
Line 1, "$(-u_y,u_y)$," should read -- $(-u_y,u_x)$, --.

Column 32,
Line 29, "imagepickup-" should read -- image-pickup --.

Signed and Sealed this

Fourth Day of December, 2001

Attest:

NICHOLAS P. GODICI
*Acting Director of the United States Patent and Trademark Office*

*Attesting Officer*